(12) United States Patent
Kumar et al.

(10) Patent No.: US 11,544,066 B2
(45) Date of Patent: Jan. 3, 2023

(54) BRANCH TARGET BUFFER ARRANGEMENT WITH PREFERENTIAL STORAGE FOR UNCONDITIONAL BRANCH INSTRUCTIONS

(71) Applicant: The University Court of the University of Edinburgh, Midlothian (GB)

(72) Inventors: Rakesh Kumar, Edinburgh Central Scotland (GB); Boris Grot, Edinburgh Central Scotland (GB); Vijay Nagarajan, Edinburgh Central Scotland (GB)

(73) Assignee: The University Court of the University of Edinburgh, Midlothian (GB)

( * ) Notice: Subject to any disclaimer, the term of this patent is extended or adjusted under 35 U.S.C. 154(b) by 0 days.

(21) Appl. No.: 16/971,419

(22) PCT Filed: Feb. 11, 2019

(86) PCT No.: PCT/GB2019/050359
§ 371 (c)(1),
(2) Date: Aug. 20, 2020

(87) PCT Pub. No.: WO2019/162647
PCT Pub. Date: Aug. 29, 2019

(65) Prior Publication Data
US 2021/0004233 A1  Jan. 7, 2021

(30) Foreign Application Priority Data
Feb. 21, 2018 (GB) .................... 1802815

(51) Int. Cl.
*G06F 9/38* (2018.01)

(52) U.S. Cl.
CPC .......... *G06F 9/3806* (2013.01); *G06F 9/3844* (2013.01)

(58) Field of Classification Search
CPC ............................ G06F 9/3806; G06F 9/3844
See application file for complete search history.

(56) References Cited

U.S. PATENT DOCUMENTS

| 5,734,881 A | 3/1998 | White |
| 5,864,707 A | 1/1999 | Tran |

(Continued)

FOREIGN PATENT DOCUMENTS

| EP | 0649084 | 4/1995 |
| WO | 2005/060458 A2 | 7/2005 |

OTHER PUBLICATIONS

Calder et al., Fast and accurate instruction fetch and branch prediction, 1994, IEEE, 1063-68974/94, 10 pages (Year: 1994).*
Superscalar processors, 2010, 36 pages, [retrieved from the internet on Aug. 21, 2021], retrieved from URL <https://www2.seas.gwu.edu/~bhagiweb/cs211/lectures/superscalar.pdf> (Year: 2010).*

(Continued)

*Primary Examiner* — Keith E Vicary
(74) *Attorney, Agent, or Firm* — Banner & Witcoff Ltd.

(57) ABSTRACT

A branch target buffer, BTB, is provided to store at least one BTB entry corresponding to a respective branch in a control flow in a sequence of machine-readable instructions of a computer program. The BTB has a tag field to compare with a program counter of a fetch address generator and at least one further field to store information characteristic of the branch instruction identified by the corresponding tag field and allowing a conditional branch to be distinguished from an unconditional branch instruction. The BTB has a predetermined storage capacity and is utilized such that unconditional branch instructions are preferentially allocated storage space in the BTB relative to conditional branch instructions.

17 Claims, 17 Drawing Sheets

(56) References Cited

U.S. PATENT DOCUMENTS

| | | | | |
|---|---|---|---|---|
| 5,935,241 | A * | 8/1999 | Shiell | G06F 9/3806 712/240 |
| 6,119,220 | A * | 9/2000 | Sato | G06F 9/3808 712/200 |
| 11,269,641 | B2 * | 3/2022 | Kumar | G06F 9/3804 |
| 2004/0193843 | A1 * | 9/2004 | Altshuler | G06F 9/3844 712/207 |
| 2005/0144427 | A1 * | 6/2005 | Col | G06F 9/3844 712/242 |
| 2011/0055529 | A1 * | 3/2011 | McDonald | G06F 9/30054 712/238 |
| 2014/0006754 | A1 * | 1/2014 | Aila | G06F 9/44 712/221 |
| 2015/0095628 | A1 * | 4/2015 | Yamada | G06F 12/0875 712/234 |
| 2017/0371668 | A1 * | 12/2017 | Bonanno | G06F 9/3806 |

OTHER PUBLICATIONS

Jenkov, Modern Hardware, Sep. 9, 2015, 6 pages, [retrieved from the internet on Aug. 21, 2021], retrieved from URL <http://tutorials.jenkov.com/java-performance/modern-hardware.html> (Year: 2015).*

Kumar, Rakesh, Boris Grot, and Vijay Nagarajan. "Blasting through the front-end bottleneck with shotgun." ASPLOS'18, Mar. 24-28, 2018; pp. 30-42 (Year: 2018).*

Kumar, Rakesh, et al. "Boomerang: A metadata-free architecture for control flow delivery." 2017 IEEE International Symposium on High Performance Computer Architecture (HPCA). IEEE, Feb. 4-8, 2017. pp. 493-504 (Year: 2017).*

Khan, Tanvir Ahmed, et al. "Twig: Profile-guided BTB prefetching for data center applications." Micro-54: 54th Annual IEEE/ACM International Symposium on Microarchitecture. 2021. pp. 816-829 (Year: 2021).*

PCT International Search Report, Search Report issued for PCT/GB2019/050359, 4 pgs., dated May 27, 2019.

* cited by examiner

| Web Search | |
|---|---|
| Nutch | Apache Nutch v1.2<br>230 clients, 1.4 GB index, 15GB data segment |
| Media Streaming | |
| Darwin | Darwin Streaming Server 6.0.3<br>7500 clients, 60GB dataset, high bitratez |
| Web Frontend (SPECweb99) | |
| Apache | Apache HTTP Server v2.0<br>16K connections, fastCGI, worker threading model |
| Zeus | Zeus Web Server<br>16K connections, fastCGI |
| OLTP - Online Transaction Processing (TPC-C) | |
| Oracle | Oracle 10g Enterprise Database Server<br>100 warehouses (10GB), 1.4GB SGA |
| DB2 | IBM DB2 v8 ESE Database Server<br>100 warehouses (10GB), 2GB buffer pool |

| | |
|---|---|
| Processor | 16-core, 2GHz, 3-way OoO<br>128 ROB, 32 LSQ |
| Branch Predictor | TAGE (17) (8KB storage budget) |
| Branch Target Buffer | 2K-entry |
| L1 I/D | 32KB/2way, 2-cycle, private<br>64-entry prefetch buffer |
| L2 NUCA cache | shared, 512KB per core, 16-way, 5-cycle |
| Interconnect | 4x4 2D mesh, 3 cycles/hop |
| Memory latency | 45 ns |

FIG. 8

BRANCH TARGET BUFFER ARRANGEMENT WITH PREFERENTIAL STORAGE FOR UNCONDITIONAL BRANCH INSTRUCTIONS

FIELD OF THE INVENTION

Examples described herein generally relate to branch prediction for a data processing apparatus and more specifically relate to circuitry for buffering branch instructions.

BACKGROUND OF THE INVENTION

Processing workloads such as server workloads may involve software having large instruction footprints due to deep-layered software stacks that may have an active instruction working set comprising megabytes of instructions. The large instruction footprint and limited available cache capacity can result in a cache problem whereby many cache misses occur during execution, resulting in processing delays due to fetching instructions from lower level (slower) memory.

Branch target buffers (BTBs) can be used to allow for prediction of branch target addresses at an instruction fetch stage instead of waiting for a branch target to become available after decoding of a branch instruction. Thus, a BTB can be used to reduce wasted processing cycles being associated with a branch instruction, although for large instruction footprints not all branch instructions can have entries in a BTB of fixed capacity.

A large instruction footprint can also cause a BTB problem where no matching entry for an instruction is found in the BTB for some branch instructions being fetched, resulting in a next sequential instruction in a linear sequence being fetched in error. This erroneous fetch may involve subsequent flushing of the instruction pipeline and associated delays. To capture tens of thousands of branch targets that may be found in, for example, server workloads, over 100 kilobytes of BTB storage may be desired.

Solutions to the cache problem and to the BTB problem could potentially enhance processor performance.

BRIEF DESCRIPTION OF THE DRAWINGS

Examples of the present technique are further described hereinafter with reference to the accompanying drawings, in which:

FIG. 8 schematically illustrates two tables comprising a first table of which shows workloads used in the simulations of FIG. 5 to FIG. 16 and a second table which shows micro-architectural parameters used for simulations;

DETAILED DESCRIPTION

There is a need for solutions to the cache problem and the BTB problem to be found. Ideally, this would be achieved without unduly increasing the silicon footprint of the BTB or the cache memory and without creating onerous storage demands for metadata associated with instruction control flow.

The present technique may apply to any branch predictor having a branch target buffer. Branch predictions allow speculative fetching of instructions. The technique applies to systems that speculatively fetch instructions. Some of those systems may also speculatively execute the instructions, but other may speculatively fetch without also speculatively executing.

Figure 1:
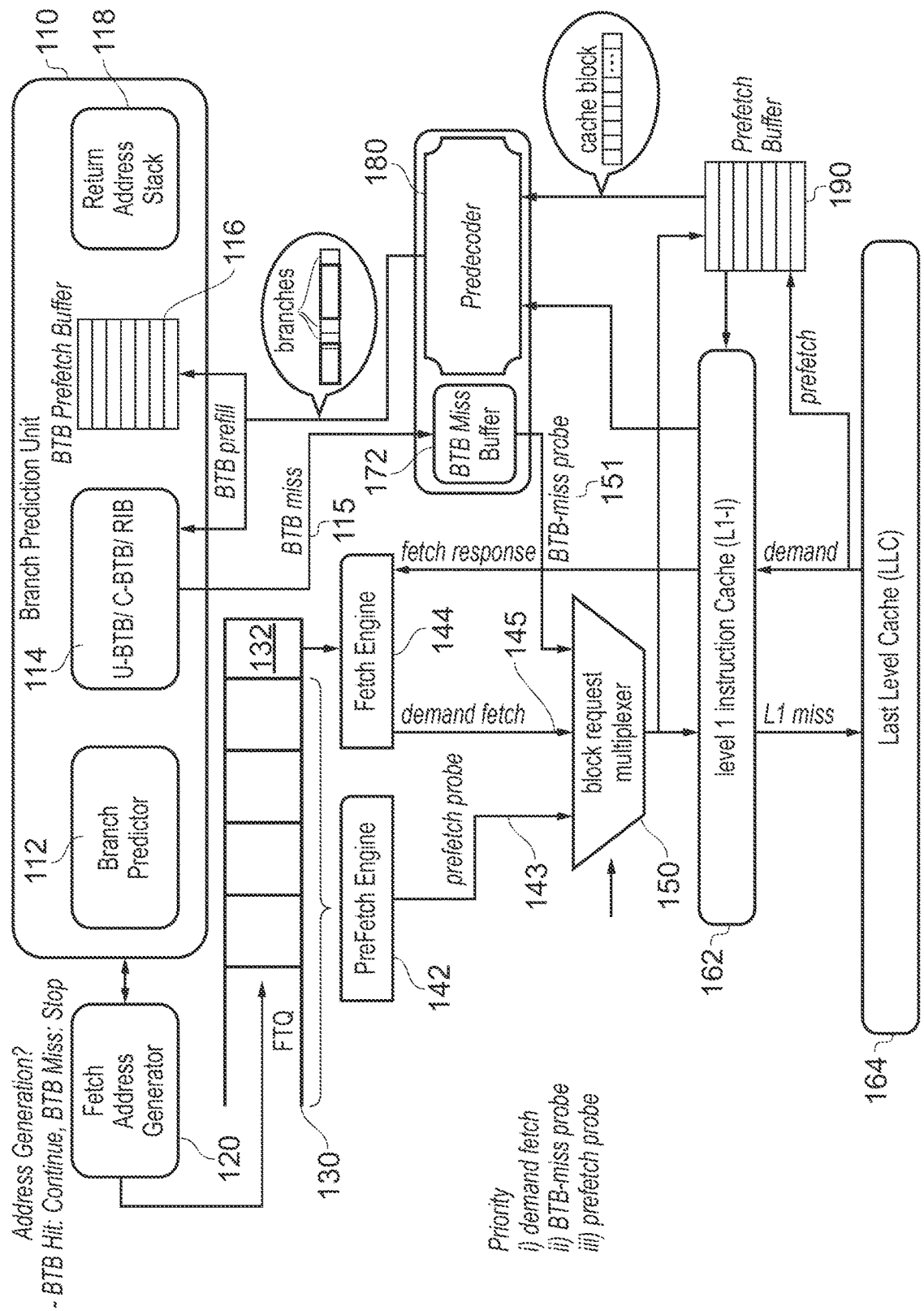
FIG. 1 schematically illustrates a data processing apparatus to perform branch prediction and instruction fetching according to the present technique.

FIG. 1 schematically illustrates a data processing apparatus to perform branch prediction and instruction fetching. The apparatus comprises a branch prediction unit 110 comprising a branch predictor 112, a branch target buffer (BTB) 114, a BTB prefetch buffer 116 and a return address stack 118. A fetch address generator 120 generates instruction addresses to populate entries of a fetch target queue (FTQ) 130. The apparatus further comprises a prefetch engine 142 and a fetch engine 144, each of which takes instruction addresses from entries of the FTQ 130. In this example. The FTQ 130 operates on a first-in-first out basis.

The return address stack 118 is a fixed size stack of return addresses that generates predictions for return instructions. The BTB 114 may be used to predict target addresses of conditional and unconditional branches, although returns may be dealt with by a Return Instruction Buffer. The BTB 114 contains information indicating that an instruction having a matching entry (a "hit") is a branch instruction and, if so, what a corresponding predicted branch target address is. In the absence of the BTB 114, the branch target address and the instruction type (branch or non-branch) would not be available at a fetch stage of an instruction pipeline, but would only become available after decoding. The BTB 114 in this example preferentially allocates storage space to unconditional branch instructions relative to conditional branch instructions. In some examples this may involve preferentially allocating predetermined storage space in a buffer of predetermined size to unconditional branch instructions, storing entries for both conditional and unconditional branch instructions in a single buffer such that, for example, unconditional branch instructions have a higher weighting than conditional branch instructions when utilising the predetermined storage space in the buffer so that the unconditional branch instructions have a higher number of BTB entries than conditional branch instructions.

Figure 3A:
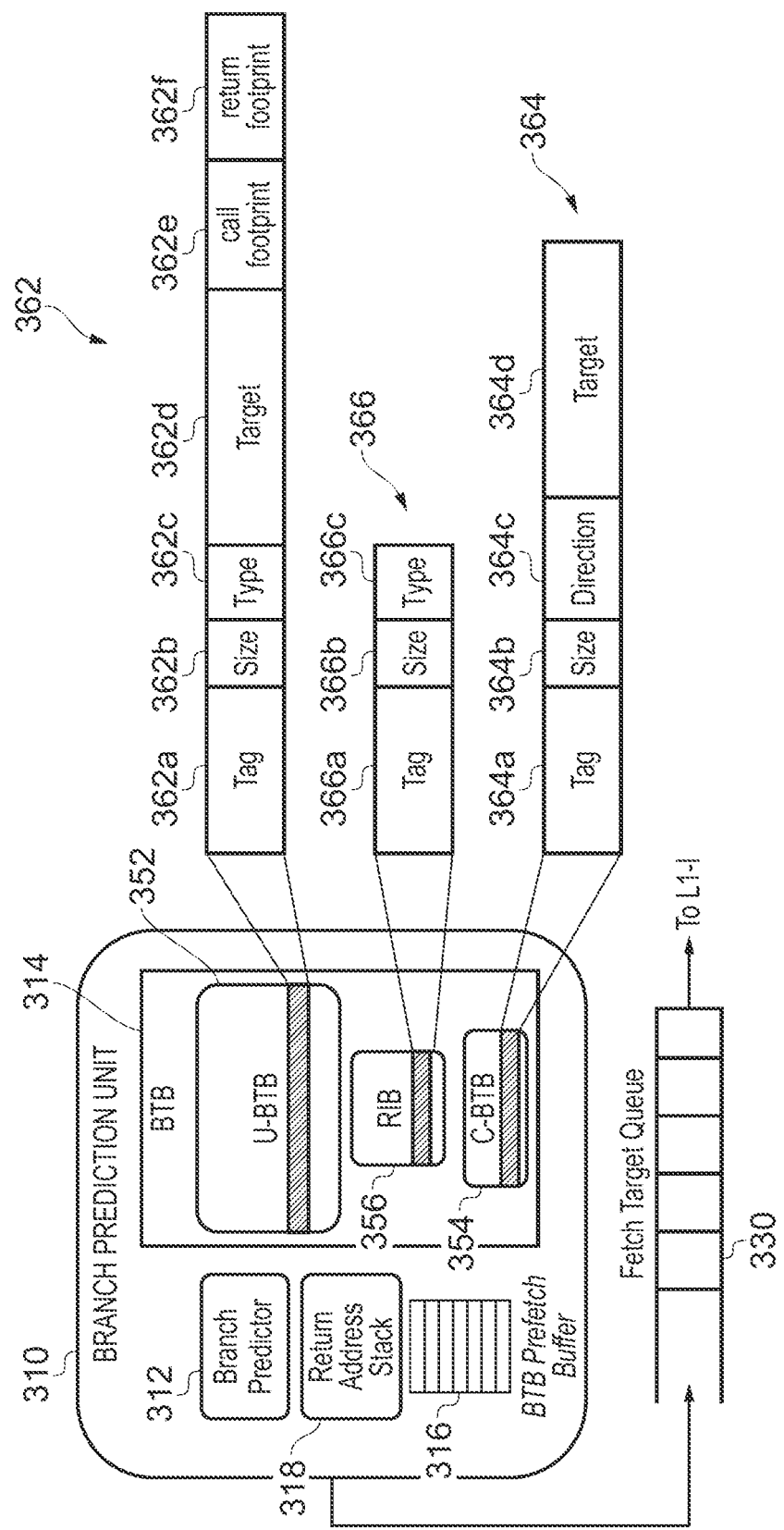
FIG. 3A schematically illustrates a branch prediction unit having a Branch Target Buffer having three components comprising an unconditional BTB, a conditional BTB and a return instruction buffer according to one example of the present technique.

In some such examples having a common buffer for conditional and unconditional branch instructions, since conditional branches tend to outnumber unconditional branches by a large ratio, it may be possible to capture a significantly large unconditional branch set of an application with half or less of a predetermined BTB capacity and yet still boost a number of entries given to unconditional branches relative to a conventional BTB, which does not preferentially allocate storage space in a BTB to unconditional branches relative to conditional branches. In other examples, as illustrated in FIG. 3A as described below, the BTB 114, 314 may comprise separate buffers 352, 354 for entries corresponding to unconditional branch instructions and for entries corresponding to conditional branch instructions such that there is dedicated physical storage for at least each of these two different types of branch instruction. Further dedicated buffer memory 356 may be dedicated to return instructions, which are a sub-category of unconditional branch instructions. The U-BTB could be either larger or smaller than the C-BTB despite preferential allocation of BTB storage to unconditional instructions.

The prefetch engine 142 and the fetch engine 144 of FIG. 1 each output one or more signals to a block request multiplexer 150 that provides an interface to a memory system of the data processing apparatus comprising at least a Level 1 instruction cache (L1 I-cache) 162 and a last level cache (LLC) 164. In this description, the term memory may refer to L1 cache memory, last level cache memory, main memory or any other memory accessible to the data processing apparatus. The prefetch engine 142 outputs a prefetch probe 143 to check for the presence of instruction(s) corresponding to occupied FTQ entries in the L1 I-cache 162. If the prefetch probe 143 encounters a miss in the L1 I-cache 162, the L1 I-cache 162 may generate an access to the LLC 164 to bring the missing block into the L1 I-cache 162.

The fetch engine 144 outputs a demand fetch signal 145 to the block request multiplexer 150, demanding retrieval of instruction(s) corresponding to a PC from the L1 I-cache 162 or the LLC 164. The block request multiplexer 150 is arranged to receive an input signal in the form of a BTB miss probe 151 from a BTB miss buffer 172 in response to output of a BTB miss signal 115 by the BTB 114. The BTB miss signal 115 indicates that a BTB miss has been detected by the branch prediction circuitry 110 in response to a BTB look-up performed for a current value of a program counter. In this example, the BTB miss is known to be a genuine BTB miss associated with a branch instruction program counter (PC) that does not currently have an entry in the BTB and not a miss associated with lookup of a PC for a non-branch instruction.

A predecoder 180 is arranged to predecode instructions received from blocks of cache memory, i.e. from one of the L1 I-cache 162 or the LLC 164, to enable identification any branch instructions within the retrieved cache block and their corresponding target addresses. Whether or not an instruction is a branch instruction, a type of the branch instruction and a branch target are not known without decoding the instruction. In the example of FIG. 1, the BTB miss probe 151 is issued by the BTB miss buffer 172, but in alternative examples the BTB miss probe, which is triggered by detection of a BTB miss in the BTB (indicated by the BTB miss signal 115), may be issued in response to a trigger by, for example, by the branch prediction unit 110 (e.g. directly from the BTB 114), by the fetch address generator 120, by the prefetch engine 142, by a dedicated BTB miss probe generator circuit or by any convenient circuit in the data processing apparatus.

A prefetch buffer 190 is arranged to store instructions retrieved from the LLC 164 in response to a prefetch probe 143 output by the prefetch engine 142. The prefetch probe 143 checks the L1 I-cache 162 to establish whether or not it contains a cache block corresponding to an entry from the FTQ 130 being prefetched, without requiring the cache block to be returned from the memory. If the L1 I-cache 162 does not contain the cache block being probed by the prefetch probe, then a fetch request is issued to the LLC 164 and the corresponding prefetched instruction(s) returned from the LLC 164 are stored as an entry in the prefetch buffer 190. This entry in the prefetch buffer 190 may subsequently be moved to the L1 I-cache 162 upon a demand fetch request for the corresponding PC from the fetch engine 144. However, in alternative examples, the prefetch buffer could be omitted and the prefetched blocks could be placed directly into the L1-I.

The pre-decoder 180 may decode instructions read from either the L1 I-cache 162 or from the prefetch buffer 190 to identify one or more branch instructions and corresponding branch targets contained therein for the purpose of pre-filling at least one of the BTB 114 or the BTB prefetch buffer 116. The branch instruction address and corresponding branch target address matching a PC for which the BTB miss was encountered is identified from the output of the predecoder 180 and stored in the BTB 114. Any other branch instruction addresses and corresponding branch target addresses from the output of the predecoded cache block(s), such as a subsequent branch instruction following the branch instruction stored in the BTB 114, may be stored in the BTB prefetch buffer 116. Note that the BTB prefetch buffer 116 is optional and in examples where this is not provided, the information can be stored directly in the BTB 114 or one of its components where a separate U-BTB, C-BTB and RIB are provided (as in FIG. 3A described below).

The FTQ 130 comprises a plurality of storage slots to receive entries corresponding to addresses in memory where individual instructions or "basic blocks" of instructions to be prefetched by the prefetch engine 142 or to be fetched by the fetch engine 144 are stored. Upon a BTB hit, the addresses of each of a plurality of the instructions of the basic block may be entered into the FTQ 130 and subsequently the instructions whose addresses are stored in the FTQ are fetched for sequential execution by the corresponding data processing apparatus. For the purposes of this specification, a "basic block" is defined to be a sequence of straight-line instructions that end in a branch. This differs from a conventional definition of a single-entry single-exit straight-line code. The nature of this definition means that basic blocks can be of variable size depending on the number of instructions preceding the branch instruction. A basic block is a building block analogous to an "atom" in the sense that if execution control flow executes one instructions (the first instruction) of the basic block then all of the instructions up to and including the terminating branch of the basic block are guaranteed to be executed.

The fetch engine 144 issues a demand fetch instruction 145 to the block request multiplexer 150 and awaits a fetch response from the L1 I-cache 162 before proceeding to fetch a next instruction from the top of the FTQ 130. The prefetch engine 142 prefetches instructions from FTQ slots other than the top slot 132 so that it runs ahead of the fetch engine 144. The prefetch engine 142 issues the prefetch probe 143 to determine whether or not the corresponding instruction or basic block is present in the memory comprising the L1 I-cache 162. If it is not present in the L1 I-cache 162 then the data can be retrieved from the LLC 164 or lower level memory. In the event of a BTB miss being detected for an address generated by the fetch address generator 120, resulting in output of the BTB miss signal 115, the block request multiplexer 150 is arranged to associate different priorities to: (i) the demand fetch issued by the fetch engine 144; (ii) the BTB miss probe 151 output by the BTB miss buffer 172; and (iii) the prefetch probe 143 output by the prefetch engine 142. The block request multiplexer 150 may be arranged to assign a higher priority to servicing the BTB miss probe 151 than a priority assigned to servicing the prefetch probe 143. However, the demand fetch signal 145 may have a higher priority than both the BTB miss probe 151 and the prefetch probe 143 to allow the fetch engine to progress through the FTQ 132 without impediment.

The BTB 114 is a fixed size hashtable that maps a program counter to a branch target address. For example if a current PC=10 then the BTB is searched for an entry marked with a PC of 10. If a matching entry is found in the BTB 114, i.e. if there is a BTB "hit", this indicates a branch instruction is being fetched for execution and gives a predicted target address of the branch. The BTB 114 is able to reliably discriminate between a current PC corresponding to a branch instruction for which no entry is currently stored in the BTB and a current PC corresponding to a non-branch instruction, in the event that no match is found in the BTB 114 for a current PC. This is possible due to storing BTB entries comprising basic blocks of instructions instead of storing BTB entries comprising individual instructions. The BTB 114 stores information about branch instructions rather than storing the branch instructions themselves.

The BTB 114 may also store branch prediction statistics indicating the level of confidence in an associated predicted branch target address stored in the BTB 114. Branching is expensive computationally in a pipelined processor because even unconditional branches require interruption of a sequence of instruction fetch operations to restart the instruction stream from a new memory location (PC) corresponding to the branch target address. In this case instruction(s) that may have already been fetched from memory and are waiting in instruction buffers or cache lines are likely to have to be discarded as a result of the switch to the new PC when the branch is taken.

Conditional branches may have to wait for operands to be generated or status bits to be set before the direction of the branch (i.e. branch taken or not) can be determined. A processor may have fetched and partially executed a number of instructions beyond the branch before it is known whether or not the branch should be taken. In examples according to the present technique, this may be avoided.

The branch target addresses stored in the BTB 114 may be updated based on the actual execution data after "retirement" of the instructions from the pipeline to improve the accuracy of the BTB predictions. The BTB 114 of the example of FIG. 1 performs the mapping of the current program counter to a basic block of instructions instead of to an individual branch instruction and entries of the FTQ 130 may also be at basic block granularity. A basic block may in some cases be smaller than a cache block and in other cases be larger than a cache block. Populating the BTB 114 with basic block entries allows the data processing apparatus to more readily distinguish between a non-branch instruction being looked up in the BTB 114 and a "genuine" BTB miss. The storage of BTB entries at a granularity of a basic blocks may guarantee that each BTB entry contains exactly one branch instruction whose target is another BTB entry. This means that if a BTB look-up fails to return a valid entry for a current program counter then that look-up may be treated as a genuine BTB miss rather than being the consequence of looking up a non-branch instruction.

The BTB populated by basic blocks may be accessed with the first address in the basic block. For example, consider the following basic block with three instructions:

A: add
B: sub
C: branch <branch marks end of basic block>
D:

In this case, the BTB 114 may be accessed with an address of first instruction which is "A". A hit in BTB for this block should indicate that the size of basic block is three instructions. So, if the branch (at address C) is predicted to be "not taken" the next access to the BTB 114 will be with address D (next sequential address to C). In this example the branch that terminates the basic block may be a conditional branch or an unconditional branch.

A BTB entry corresponding to a basic block is created when filling a BTB miss in the BTB 114 (see process element 420 in the flowchart of FIG. 4 described below). A basic block may also be created when the instructions are "retired" from the pipeline, having finished execution correctly. When a branch instruction is retired, a BTB entry corresponding to the basic block is created and saved, or alternatively, if a corresponding entry is already present in the BTB, the entry is updated. The updating relates to the branch prediction statistics which feedback to improve the accuracy of the branch prediction.

In the event of a BTB miss corresponding to an attempted look-up of the current PC, then the branch target of the basic block look-up that triggered the BTB miss is not known. For this reason, the PC is not inserted in the FTQ 130, but instead is stored in the BTB miss buffer 172 until the BTB miss is resolved using the predecoder 180 and possibly also using the prefetch buffer 190. The BTB miss probe 151 can eventually result in the BTB miss being resolved by identifying the appropriate branch instruction address and corresponding branch target address, corresponding to the PC for which the BTB miss was encountered, via the predecoder 180.

In the FIG. 1 example, each entry of the FTQ 130 may contain information about a basic block, for example, the start address of the basic block, the number of instructions in basic block or the number of bytes in a basic block, etc. Therefore, if there are three instructions in a basic block, the FTQ entry may contain the address of first instruction and also specify that there are three instructions so that fetch engine 144 knows how many instructions to fetch starting from the first address of the basic block. The fetch engine 144 reads the head of the FTQ 130 comprising the top FTQ entry 132 and issues a non-zero integer number, N, of demand fetch requests to the I-cache where N refers to an instruction fetch width. Depending upon implementation, the fetch engine 144 may wait for a response before issuing subsequent fetch requests. This corresponds to an in-order fetch policy and thus if the instructions corresponding to a demand fetch signal 145 are not found in the L1 I-cache 162, then the fetch engine 144 may stall until the requested data is returned from the LLC 164 and written to the L1 I-cache 162. In alternative examples, each FTQ entry or at least a non-zero subset of the FTQ entries may comprise a single instruction address, although the basic block FTQ entries are more economical with storage space in memory.

The prefetching of instructions performed by the prefetch engine 142 is performed to in order to appropriately populate the L1 I-cache 162 in readiness for demand fetch instructions to be subsequently issued by the fetch engine 144. According to the present technique, at least a subset of an incoming instruction prefetch stream based on the FTQ 130 is exploited for the purposes of at least one of: (i) pre-filling the BTB 114; or (ii) populating the BTB prefetch buffer 116. The subset of the prefetch stream used corresponds to BTB miss-probe triggered cache blocks. Thus, branch-prediction based instruction prefetching in this example is used to populate the L1 I-cache 162, but the prefetching is further utilised beyond its originally intended function to also populate the BTB 114.

The use of the prefetching to populate the BTB can be implemented without any modifications to accommodate storage of a large volume of metadata and can use existing branch-prediction driven prefetch circuitry. The modifications to the data processing apparatus to implement the BTB fill in response to a genuine BTB miss comprise adding the BTB miss buffer 172, the BTB prefetch buffer 116 and the block request multiplexer 150. The predecoder 180 allows branch instructions and branch targets to be identified in the prefetched cache blocks. The present example differs from previous examples that used prefetching for both cache prefilling and BTB population by according a higher priority to storing unconditional branch instructions relative to conditional branch instructions. The preferential storage of entries corresponding to unconditional branch instructions in the BTB enables effective BTB-directed prefetching at reduced storage cost. This is based on an insight that contemporary software tends to be structured as a collection of functions and within each function there is likely to be a high spatial locality of the instructions in instruction cache blocks. Conditional branches having short offsets tend to steer local control flow between these cache blocks whereas unconditional branches having long offsets (e.g. calls and returns) tend to drive global control flow from one function to another. Thus, the code footprint of an application can be efficiently and effectively mapped by primarily using as full as possible a set of unconditional branches. For each unconditional branch, a group of instructions in the vicinity of the branch target, such as a "spatial footprint" or another group of instructions determined based on the unconditional branch target, can be used to identify blocks of the instruction cache likely to be accessed. Since the unconditional branches typically comprise a small fraction of an application's full set of branch instructions, a large fraction of unconditional branches can be captured in a practically-sized BTB. Capturing such a high fraction of unconditional branches would not be possible if conditional branches share capacity with unconditional branches without any prioritization or partitioning of the capacity.

Figure 2:
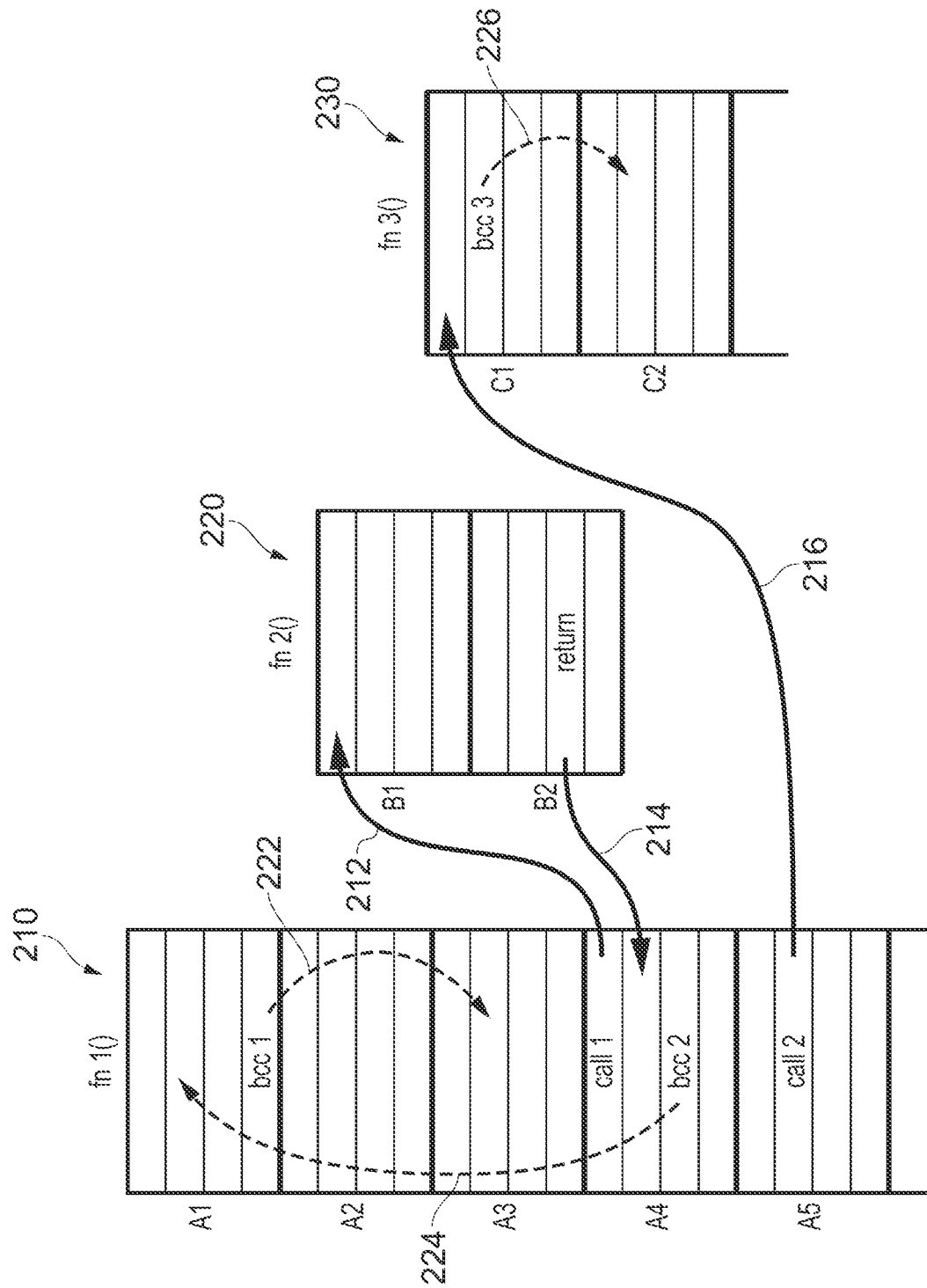
FIG. 2 schematically illustrates an example program control flow including a global control flow dictated by unconditional branches and a local control flow dictated by conditional branches in the vicinity of branch targets of unconditional branches.

FIG. 2 schematically illustrates an example program control flow including a global control flow dictated by unconditional branches and a local control flow dictated by conditional branches in the vicinity of branch targets of unconditional branches. A set of solid arrows 212, 214, 216 represent global control flow dictated by unconditional branches and their respective targets. A set of dashed arrows 222, 224 and 226 represent local control flow. FIG. 2 shows five memory blocks A1, A2, A3, A4 and A5 corresponding to a first program function fn(1) 210; two memory blocks B1 and B2 corresponding to a second program function fn(2) 220; and two memory blocks C1 and C2 corresponding to a third program function fn(3) 230. In this illustrative example, each memory block has four entries, each of which may correspond to a program instruction. According to the present technique, the global control flow corresponds to unconditional branch instructions comprising a first call instruction "call1" in a block A4, a second call instruction "call 2" in a block A5 and a "return" instruction in the block B2. The local control flow corresponds to conditional branch instructions comprising a first conditional branch "bcc1" in block A1, a second conditional branch "bcc 2" in block A4 and a third conditional branch "bcc 3" in block C1. Consider a control flow comprising execution of instructions in fn1( ) 210, starting from a first instruction in the block A1. Instructions in the block A1 are executed until the first conditional instruction bcc 1. Assuming the condition is satisfied, then the control flow jumps from bcc 2 via dashed arrow 222 to a second entry in the block A3 and then a further two instructions are executed to arrive at the first unconditional instruction "call 1". Upon execution of "call 1", control passes via solid arrow 212 to the second function fn(2) 220 and to execution of a first instruction of the block B1, which is a branch target of "call 1". In this example, the branch target is the address of the target instruction, which in this case is the address of the first instruction in B1. When in the next processing cycle the BTB is searched with the address of the first instruction of B1, the corresponding BTB entry will be found to encode the size of the basic block: seven instructions comprising four instructions of B1 and three instructions of B2 terminating with "return" instruction (unconditional branch) in the penultimate slot of block B2. Instructions in the region of the branch target of call 1 and comprising the first instruction in B1 up to the return instruction in B2 can be defined as a "call footprint" of call 1 whereas a "return footprint" can be defined to be a control flow followed upon return to the second instruction in A4 after executing the return instruction in B2. Both the call footprint and the return footprint are examples of spatial footprints defining memory regions containing instructions associated with the control flow upon taking an unconditional branch instruction call and return respectively. In this example, the call footprint and return footprint have an instruction level granularity. However, in alternative examples, the spatial footprints may have cache block granularity rather than instruction granularity. Defining the call and return footprints in terms of cache blocks may be more efficient to implement because it uses less storage to define the footprints. The call footprint and return footprint are discussed further with reference to FIG. 3A as described below.

Upon execution of the return instruction, global control flow passes back via solid arrow 214 to the second entry of the block A4 in fn(1) 210. Thus, the second instruction in the block A4 corresponds to a first instruction in the return footprint of unconditional branch "call 1". Since the block A4 comprises the second conditional instruction "bcc 2" in the third entry, subsequent control flow depends on whether or not a branch corresponding to "bcc 2" is taken and, if that conditional branch is in fact taken, whether or not a branch corresponding to the first conditional branch instruction "bcc 1" is taken. In particular, if "bcc 2" is not taken then the return footprint of the field 362f of "call 1" may be A4, A5.

If, on the other hand, the "bcc 2" conditional branch is in fact taken the return footprint may be either: (i) A4, A1 and A3 if "bcc 1" is also taken upon execution of instructions in the block A1; or (ii) A4, A1, A2, A3 if "bcc 1" is not taken. In the two examples where "bcc 2" is taken, the program control flow passes from A4 to A1. Without the spatial footprint it is unknown which cache blocks or instructions will be needed after the second conditional branch bcc2. What is known without the spatial footprint is that at least instructions up to bcc2 are needed because it is in the target basic block of return. However, by specifying the spatial footprint further information is provided regarding instructions expected to be accessed. In particular, the instructions expected to be accessed in this example will be those in: (i) A4 and A5 if bcc2 is not likely to be taken; or (ii) A4, A1 and A3 if bcc2 is likely to be taken and bcc1 is subsequently likely to be taken; or (iii) A4, A1, A2, A3 if bcc2 is likely to be taken but bcc1 is not likely to be taken subsequently. Spatial footprints may be used for prefetching to more accurately define instructions expected to be accessed following execution of an unconditional branch.

For the second unconditional instruction "call 2" in A5, the branch target is a first instruction of the block C1 in fn3( ) 230 and the basic block terminates with the conditional instruction "bcc 3" in the second entry of block 01.

In some examples, the contents of the call footprint field 362e and the return footprint field 362f of FIG. 3A may be used to determine how to populate the C-BTB 354 with conditional instructions based on predecoded instructions to be loaded into the L1-I cache. However, in alternative examples, the call footprint 362e and return footprint 362f may not be needed. In one such alternative example prefetching scheme, for the first unconditional instruction "call 1" of FIG. 2, all instructions up until the next unconditional instruction, "return" in fn2( ) B2 220 could be loaded into the L1-I. This is because call 1 will always be taken (unconditional) and will thus take execution to B1, hence the next unconditional branch is the return in B2. In other words all memory blocks (e.g. cache blocks) between an entry point and an exit point of a target region may be loaded. In yet a further alternative example prefetching scheme a configurable number of consecutive cache blocks (e.g. 4, 5 or 6 blocks) or consecutive instructions in a target region and following the unconditional branch target may be prefetched. This consecutive instruction prefetching scheme is simpler to implement than the spatial footprint based prefetching, but the footprint based prefetching can offer increased accuracy and efficiency. Thus both of these different example schemes have associated advantages.

Note that since the spatial footprint (call footprint and/or return footprint) or other spatial region in the vicinity of the target of an unconditional branch instruction may contain at least one instruction that should not be executed as well as instructions that will be in the execution control flow, these instructions that should not be executed, while prefetched to populate L1-I, are not entered into the FTQ 130. The purpose of the spatial prefetching in the region of the target of an unconditional branch instruction may serve to efficiently populate cache memory in readiness for execution of the prefetched instruction sequence in the FTQ 230.

According to the present technique, unconditional branches are prioritized for BTB storage relative to conditional branches to drive prefetching of instructions to increase the likelihood that appropriate instructions will be stored in the L1-I 162 at execution time.

FIG. 3A schematically illustrates a branch prediction unit 310 having a BTB 314 according to one example of the present technique. In this example, the BTB 314 has: an unconditional BTB (U-BTB) 352 dedicated to storing entries for unconditional branch instructions; a conditional BTB (C-BTB) 354 dedicated to storing entries for conditional branch instructions; and a Return Instruction Buffer (RIB) 356 dedicated to tracking return instructions corresponding to function and trap returns. The branch prediction unit 310 also comprises a branch predictor 312 and a BTB prefetch buffer 316 having functions as described for the correspondingly named components in FIG. 1. The branch prediction unit 310 is arranged to populate a fetch target queue 330 of instructions queued for execution.

As illustrated in FIG. 3A, a U-BTB entry 362 comprises a tag field 362a, a size field 362b, a type field 362c, a target field 362d, a call footprint field 362e and a return footprint field 362f. The tag field 362a is matched against a program counter (or a portion thereof) to identify whether or not a given program counter has a corresponding entry in the U-BTB 352. The tag field 362a may be compared with the program counter of the fetch address generator to determine if there is a match between the program counter and information regarding a branch instruction currently stored in the BTB 314. The size field 362b in this example gives a size (number of instructions) of a basic block corresponding to the matched unconditional branch instruction. FIG. 3A is a basic-block type BTB 314, and in this case the tag field 362a results in a BTB hit if it matches a first instruction of a basic block for which information is stored in the BTB and a branch instruction within that basic block can be located via the size field 362b. Considering the simple example basic block described previously with reference to FIG. 1, a basic block based BTB will show a hit when it is indexed with A (PC of the first instruction in basic block), not C (the branch instruction). In addition, using the size field, a basic block based BTB can tell where the next branch is, in this case it is after 2 instructions (size field will be 2), so that the branch can be predicted and PC can be updated accordingly. In alternative examples which use an instruction by instruction based rather than a basic-block based BTB, a tag field when compared with a PC would show a hit when indexed with the PC of the branch, i.e. instruction C in the basic block previously described, assuming that the BTB contains the information about branch C.

The type field 362c in FIG. 3A specifies the type of branch instruction such as call, jump etc. The target field 362d specifies a target address of the branch instruction, which is the next instruction to be executed following execution of the corresponding branch instruction (assuming the branch condition is satisfied in the case of a conditional branch). The call footprint field 362e identifies a spatial footprint in memory of program instructions of a "local function" corresponding to a plurality of instructions at a given spatial location in memory proximal to the branch target. The return footprint field 362f identifies a spatial footprint in memory of a sequence of program instructions corresponding to an instruction execution control flow on return from the local function and until a subsequent unconditional branch instruction is encountered. In this non-limiting example, the U-BTB entry is a 106-bit entry consisting of a 38-bit tag, 46-bit target, 5 bits for the basic-block size, and 1 bit for branch type (unconditional or call). The two spatial footprints 362e, 362f may be stored in two eight-bit vectors, for example. The vectors may indicate offsets before and/or after the target address, each vector entry indicating whether or not a corresponding memory block was accessed during one or more previous execution of the "local function" corresponding to the branch target. At least a subset of the footprint vector elements may represent relative block distances from the branch target block and the relative distances may comprise positive relative distances, negative relative distances or both positive and negative relative distances.

FIG. 3A also shows a representative data structure for a C-BTB entry 364 having a tag field 364a, a size field 364b, a direction field 364c and a target field 364d. The tag field 364a provides an index into the C-BTB 354 and is compared with an incoming PC (or portion thereof) to determine whether or not the PC corresponds to a basic block containing an conditional branch instruction having an entry in the C-BTB 354. The size field 364b in this example gives a number of instructions in a basic block corresponding to a target of the corresponding conditional branch instruction. The direction field 364c may give an indication of whether or not the corresponding branch is likely to be taken or not. The target field 364d gives a target address for the conditional branch, which is a PC that will be jumped to in the event that the branch is taken. In the FIG. 3A example, the C-BTB entry 364 is a 70-bit entry with each C-BTB entry comprising a 41-bit tag, a 22-bit target offset, 5 bits for basic-block size, and 2 bits for conditional branch direction prediction. Notice that only a 22-bit target offset is used, instead of the complete 46-bit target address (as used for the U-BTB 352), this is because conditional branches tend to use PC relative offsets.

A representative data structure 366 for an RIB entry is shown in FIG. 3A to comprise a tag field 366a, a size field 366b and a type field 366c. Compared to the U-BTB data structure 362, the RIB data structure 366 has no spatial footprint fields, nor does it have a target address field. Compared to the C-BTB data structure 362, the RIB entry has no direction field and no target field. The direction field is not necessarily needed in the RIB structure 366 because the return instructions to which entries correspond are unconditional branches. The target field is not necessarily needed in the RIB structure 366 because the target address is instead obtained from the return address stack 318. In this non-limiting example, the RIB data structure 366 is a 45-bit entry having a 39-bit tag, 5 bits for basic-block size, and 1 bit for branch type (return or trap-return). As return instructions derive their target from the RAS 318, the RIB 356 does not store the target addresses.

Implementation of the RIB 356 in the BTB 314 according to the present technique allows for more efficient use of memory in the BTB 314 because entries of the RIB 356 can exclude a target field 362d, 364d and thus entries occupy fewer bits than they would otherwise. In the absence of the RIB 356, return instructions would otherwise likely be inserted in the U-BTB 252. The target field 362d, 364d in at least some examples occupies more than half of the bit-length of an individual U-BTB 352 entry, so eliminating the target field can improve storage efficiency. Furthermore, studies have shown that, in the absence of an RIB 356, approximately 25% of U-BTB entries would likely be occupied by return instructions in a BTB that prioritises buffering of unconditional branches relative to conditional branches. By way of contrast, in a conventional BTB, fewer than 10% of entries are likely to correspond to return instructions because over 70% of conventional BTB entries are likely to be occupied by conditional instructions. The target of entries in the RIB 356 can be read from a Return Address Stack (RAS) 318.

In the example BTB 314 of FIG. 3A, the U-BTB 352 has a comparatively greater number of entries than the C-BTB 354 and the RIB 356 has a comparatively greater number of entries that the C-BTB 354, but has fewer entries that the U-BTB 352. For example, in one example implementation, the U-BTB 352 may have at least a factor of 10 more entries than the C-BTB 354 and the RIB 356 may have approximately five times as many entries as the C-BTB 354. According to the present technique, the capacity of the BTB 314 is preferentially allocated to unconditional branch instructions relative to conditional branch instructions. This may be implemented either in a single buffer arranged to store both unconditional and conditional branch instructions in the same buffer, but in which unconditional branches are accorded a larger proportion of entries in the single buffer than the conditional branches. Alternatively, the present technique may be implemented by providing separate buffers dedicated respectively to unconditional branches and conditional branches.

Despite preference being given to storage of unconditional branches, an appropriate subset of conditional branches can be prefetched into the BTB 314 (for example, into the C-BTB 354) by making use of information in the footprint fields 362e, 362f of an unconditional branch instruction entry 362, the footprint fields being used to bring cache lines in to the L1-I 162 (see FIG. 1). The footprint 362e corresponds to a spatial encoding of memory (e.g. cache blocks) in the vicinity of an unconditional branch target. The C-BTB 354 may be populated based on the spatial footprints 362e, 362f by prefetching and predecoding cache blocks corresponding to the spatial footprint, extracting conditional branches contained in those prefetched blocks and storing them in the C-BTB 354.

A data processing apparatus according to the present technique employs the FTQ 330, as shown in FIG. 3A, to hold the fetch addresses generated by the branch prediction unit 310. These addresses are later consumed by a fetch-engine to fetch and feed the corresponding instructions to core back-end. To fill the FTQ 330, the branch predictor 312 may query all three BTBs (U-BTB 352, C-BTB 354, and RIB 356) in parallel. If there is a hit in any of the BTBs 352, 354, 356, the appropriate fetch addresses are inserted into the FTQ 330. As these addresses are eventually going to be used for fetching instructions from L1-I, they represent natural prefetching candidates. Therefore, the present technique capitalizes on this opportunity by scanning through the fetch addresses, as they are inserted into the FTQ 330, and issuing prefetch probes for corresponding L1-I blocks.

On a U-BTB or RIB hit in the branch prediction unit 310 of FIG. 3A, the spatial footprint 362e of the target code region is read to issue L1-I prefetch probes for appropriate cache blocks. Accessing the spatial footprint is simple for U-BTB hits because it is directly read from the footprint field 362e of the corresponding U-BTB entry. However, the mechanism is slightly more involved on RIB hits because the required spatial footprint is not stored in the RIB, rather the spatial footprint is stored in the U-BTB entry of the corresponding call. To find the relevant U-BTB entry, the RAS 318 is extended relative to a conventional RAS such that on a call, in addition to the return address that normally gets pushed on the RAS 318, the address of the basic block containing the call is also pushed onto the RAS 318. In this example, because a basic-block oriented BTB is implemented, it is the basic block and not the PC corresponding to the call instruction that is stored on the RAS 318. The RAS 318 typically contains a small number of entries (8 to 32 is common), so the additional RAS storage cost of storing the address of the basic block containing the call in the RAS 318 is negligible. On an RIB hit for a return instruction, the branch prediction unit 310 pops the basic block address of the associated call from the RAS 318 and uses this to index the U-BTB and to retrieve the spatial footprint from the return footprint field 362f.

In addition to using the spatial footprints 362e, 362f of the unconditional branch BTB entries to prefetch instructions into the L1-I, the present technique exploits control flow commonality to also prefetch into the C-BTB 354. Thus, when the prefetched blocks arrive at the L1-I, a set of predecoders is used to extract branch metadata from the prefetched blocks and this is used to populate the C-BTB ahead of the access stream. By anticipating the upcoming instruction working-set via the spatial footprints 362e, 362f and prefetching its associated branch working set into the C-BTB 354 via predecoding, a small and yet highly effective C-BTB 354 is provided.

Figure 3B:
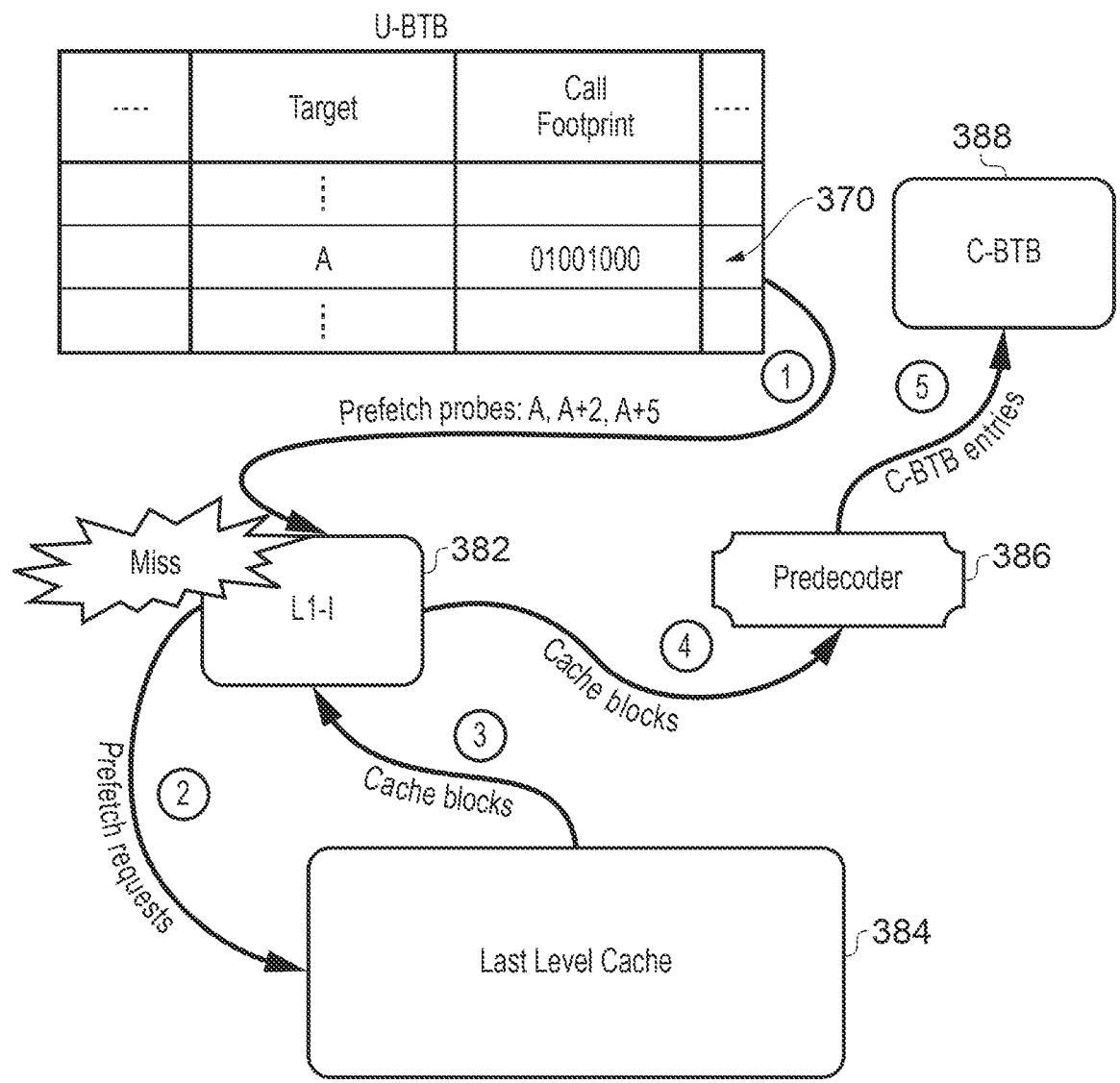
FIG. 3B schematically illustrates a working example of using a spatial footprint for both cache and conditional branch prefetching when a Branch Target Buffer hit for an unconditional branch occurs.

FIG. 3B schematically illustrates a working example of using a spatial footprint for L1-I and C-BTB prefetching when a U-BTB hit occurs. FIG. 3B shows an L1-I 382, an LLC 384, a predecoder 386 and a C-BTB 388. These components have similar functionality to the correspondingly named components in FIG. 1. The branch prediction unit 310 (see FIG. 3A) first reads a target address "A" and a call footprint "01001000" from a given U-BTB entry 370. It then generates prefetch probes to the L1-I 382 for the target block "A" and, based on the call footprint in the U-BTB entry 370, for cache blocks "A+2" and "A+5" (arrow {1}). If any of these blocks are not found in the L1-I 382, the branch prediction unit 310 issues prefetch request(s) to the LLC 384 (arrow {2}). Once prefetched blocks arrive from the LLC 384, they are installed in the L1-I 382 (arrow {3}) and are also forwarded to the predecoder 386 (arrow {4}). The predecoder 386 extracts the conditional branches from the prefetched blocks and inserts them into the C-BTB 388 (arrow {5}).

If the branch prediction unit 310 detects a miss in all three BTBs 352, 354, 356, then it invokes a BTB fill mechanism (denoted "Boomerang") to resolve the miss in the following manner: first, an instruction block corresponding to the missed branch is accessed from L1-I 382 or from lower cache levels 384 if not present in the L1-I. The block is then fed to the predecoder 386 that extracts the missing branch and stores it into one of the BTBs 370, 388 depending on branch type. The rest of the predecoded branches are stored in the BTB Prefetch Buffer 116 (See FIG. 1). On a hit to the BTB Prefetch Buffer 116, the accessed branch is moved to the appropriate BTB 370, 388 or an RIB (not shown in FIG. 3B) based on the branch type.

Figure 4:
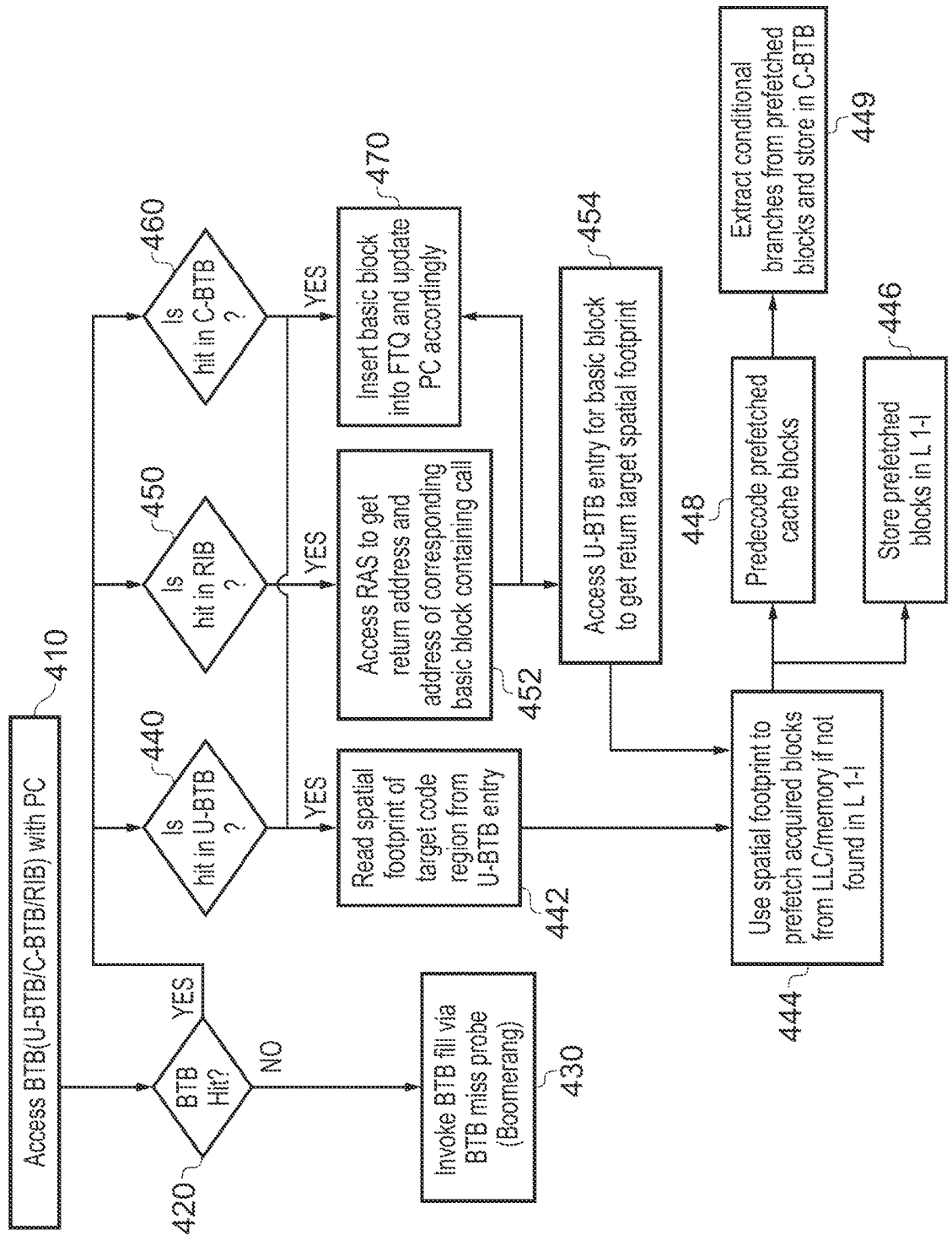
FIG. 4 is a flow chart schematically illustrating how a BTB having a dedicated Unconditional-BTB, Conditional-BTB and Return Instruction Buffer is utilised.

FIG. 4 is a flow chart schematically illustrating how the BTB 314 of FIG. 3A having distinct U-BTB 352, C-BTB 354 and RIB 356 is utilised according to one example. At element 410, the BTB is accessed with a PC to determine if the current PC corresponds to a first instruction in a basic block that includes a branch instruction and has an entry in the BTB 314. At element 420 it is determined whether or not there is a BTB hit for the current PC. If there is a miss in the BTB, the process goes to element 430, where a BTB miss probe is issued to retrieve one or more instructions corresponding to the BTB miss from memory, to allow them to be predecoded and to trigger prefilling of the BTB with an entry corresponding to the BTB miss so that it is available subsequently.

If at element 420, a BTB hit occurs, subsequent operations depend upon the type of BTB hit. In this example, the BTB for preferentially storing unconditional instructions has a U-BTB 352, a C-BTB 354 and an RIB 356 dedicated respectively to unconditional branches, conditional branches and return instructions.

In the event that there is a BTB hit at element 420, regardless of whether it is a U-BTB hit, an RIB hit or a C-BTB hit, the process includes element 470, which involves inserting the basic block corresponding to the BTB hit into the FTQ and updating the PC accordingly. The BTB tracks blocks of instructions that end in a branch. If control flow enters the basic block then all instructions up to and including the terminating branch of the basic block are guaranteed to be executed. Thus, all of the instruction addresses in the basic block are inserted in the FTQ at element 470. If the terminating branch instruction of the basic block is a conditional branch, the branch may be predicted and the PC may be updated accordingly. Once a new PC is available it is used to index the BTB and a new basic block is accessed. The BTB indicates via the size field 362b, 364b 366b (see FIG. 3A) how may instructions (or bytes from a starting address) are to be fetched via the FTQ 330. If the hit is determined to be in the U-BTB at element 440 of FIG. 4, the spatial footprint (e.g. call footprint field 362e) of the region in the vicinity of the branch target is read from the BTB entry at element 442. Alternatively, a fixed number of cache blocks or instructions in the vicinity of the unconditional branch target is read. In a further alternative all instructions from the branch target until a next unconditional branch in the control flow are identified at element 442. Then at element 444 the spatial footprint (or other instructions in the vicinity of the branch target) is used to prefetch blocks from the LLC or memory if the instructions are not in the L1-I. Next, the prefetched spatial footprint instructions are utilised for two distinct purposes. Firstly, at element 446, the prefetched cache blocks corresponding to the spatial footprint instructions are stored in L1-I. Secondly, after element 444, the process also proceeds to element 448 where the prefetched cache blocks corresponding to the spatial footprint are predecoded and then, at element 449, any conditional branches are extracted from the prefetched cache blocks and stored in a BTB prefetch buffer (116 in FIG. 1) or directly in the C-BTB. Thus, the C-BTB is dynamically populated depending on the branch target of a recently encountered unconditional branch. This allows for more efficient use of limited BTB capacity by dedicating the bulk of the BTB capacity to global control flow (unconditional branches) and yet facilitating availability of the conditional branches likely to be executed imminently in a C-BTB, which has fewer entries than the U-BTB.

If the BTB hit at element 420 is an RIB hit, rather than a U-BTB hit or a C-BTB hit, then the process goes from element 420 to element 450 and then to element 452, where the RAS 318 is accessed to determine a return address of a basic block corresponding to the function call. Once the return address has been determined, it is used to update the PC and the process proceeds to element 454 where the return footprint (or equivalently return call footprint) is accessed via a U-BTB entry 362 for the given basic block. Once the return footprint 362*f* has been accessed, this is used to prefetch blocks corresponding to that footprint from LLC or lower memory at element 444 and then both to: (i) prefetch the return footprint instruction into the L1-I at element 446; and (ii) predecode prefetched cache blocks of the return footprint at 448 and to extract conditional branches from them at element 449 and to store those extracted conditional branches in the C-BTB 354.

If at element 420 it is determined at element 460 that the BTB hit is in the C-BTB 354 rather than in the U-BTB or the RIB then the process proceeds directly to element 470 where instruction addresses for the basic block corresponding to the hit are inserted into the FTQ and the PC is updated accordingly.

Further aspects and features of examples according to the branch prediction based BTB circuitry according to the present technique are provided in the following text, which includes description of simulation results evaluating the performance of the present technique for executing a number of different program applications and considering a number of alternative control flow delivery mechanisms to the branch-prediction based BTB prefilling according to the present technique. In the description below and in some of the associated Figures, one example implementation of the present technique is denoted "Shotgun" as a label for ease of reference. A related technique, corresponding to issuing the BTB miss probe 115 of FIG. 1 to prefill the BTB and to populate the BTB miss buffer 172 may be referred to as "Boomerang".

References referred to in the following text are listed together at the end of the description of FIG. 16 after the conclusion for the simulation results and are indicated in square brackets.

"Shotgun" is a non-limiting example of the present technique.

The front-end bottleneck is a well-established problem in server workloads owing to their deep software stacks and large instruction working sets. Despite years of research into effective L1-I and BTB prefetching, state-of-the-art techniques force a trade-off between performance and metadata storage costs. This description introduces "Shotgun" (the present technique), a BTB-directed front-end prefetcher powered by a new BTB organization that may maintains a logical map of an application's instruction footprint, which enables high-efficacy prefetching at low storage cost. To map active code regions, Shotgun may in some examples precisely track an application's global control flow (e.g., function and trap routine entry points) and summarizes local control flow within each code region. Because the local control flow enjoys high spatial locality, with most functions comprised of a handful of instruction cache blocks, it lends itself to a compact region-based encoding. Meanwhile, the global control flow is naturally captured by the application's unconditional branch working set (calls, returns, traps). Based on these insights, Shotgun devotes the bulk of its BTB capacity to branches responsible for the global control flow and a spatial encoding of their target regions. By effectively capturing a map of the application's instruction footprint in the BTB, Shotgun enables highly effective BTB-directed prefetching. Using a storage budget equivalent to a conventional BTB, Shotgun outperforms the state-of-the-art BTB-directed front-end prefetcher by up to 14% on a set of varied commercial workloads. Shotgun prioritises storage of information corresponding to unconditional branch instructions in a BTB relative to storage of information corresponding to conditional branch instructions. Shotgun may provide dedicated BTBs for unconditional and for conditional branch instructions or may alternatively implement preferential storage of information corresponding to unconditional branch instructions in a BTB that also stores information corresponding to conditional branch instructions.

1. Introduction

Traditional and emerging server workloads are characterized by large instruction working sets stemming from deep software stacks. A user request hitting a modern server stack may go through a web server, database, custom scripts, logging and monitoring code, and storage and network I/O paths in the kernel. Depending on the service, even simple requests may take tens of milliseconds to complete while touching MBs of code.

The deep stacks and their large code footprints can easily overwhelm private instruction caches (L1-I) and branch prediction structures, diminishing server performance due to the so-called "front-end bottleneck". Specifically, instruction cache misses may expose the core to tens of cycles of stall time if filled from the last-level cache (LLC). Meanwhile, branch target buffer (BTB) misses may lead to unpredicted control flow transfers, triggering a pipeline flush when mis-speculation is discovered.

The front-end bottleneck in servers is a well-established problem, first characterized in the late 90s [1, 11, 14]. Over the years, the problem has persisted; in fact, according to a recent study from Google [8], it is getting worse due to continuing expansion in instruction working set sizes in commercial server stacks. As one example of this trend, the Google study examined the Web Search workload whose multi-MB instruction footprint had been expanding at an annualized rate of 27%, doubling over the course of their study [8].

Microarchitecture researchers have proposed a number of instruction [4, 5, 12, 15, 17] and BTB [2, 3] prefetchers over the years to combat the front-end bottleneck in servers. State-of-the-art prefetchers rely on temporal streaming [5] to record and replay instruction cache or BTB access streams. While highly effective, each prefetcher requires hundreds of kilobytes of metadata storage per core. Recent temporal streaming research has focused on lowering the storage costs [9, 10, 12]; however, even with optimizations, for a many-core CMP running several consolidated workloads, the total prefetcher storage requirements can reach into megabytes.

To overcome the overwhelming metadata storage costs of temporal streaming, the latest work in relieving the front-end bottleneck leverages fetch-directed instruction prefetching (FDIP) [15] and extends it with unified prefetching into the BTB [13]. The scheme, called Boomerang, discovers BTB misses on the prefetch path and fills them by fetching the appropriate cache blocks and extracting the necessary branch target metadata.

While Boomerang reduces the prefetcher costs to near zero by leveraging existing in-core structures (BTB and branch direction predictor), it has limited effectiveness on workloads with very large instruction working sets. Such workloads result in frequent BTB misses that reduce Boomerang's effectiveness, because instruction prefetching stalls whenever a BTB miss is being resolved to uncover subsequent control flow. As a result, Boomerang captures less than 50% of the opportunity of an ideal front-end prefetcher on workloads with the largest instruction working sets.

This work addresses the key limitation of Boomerang, which is that a limited-capacity BTB simply cannot track a sufficiently large control flow working set to guarantee effective instruction prefetching. Our solution is guided by software behaviour. Specifically, we observe that contemporary software is structured as a collection of small functions; within each function, there is high spatial locality for the constituent instruction cache blocks. Short-offset conditional branches steer the local control flow between these blocks, while long-offset unconditional branches (e.g., calls, returns), drive the global control flow from one function to another.

Using this intuitive understanding, we make a critical insight that an application's instruction footprint can be mapped as a combination of its unconditional branch working set and, for each unconditional branch, a spatial encoding of the cache blocks around the branch target. The combination of unconditional branches and their corresponding spatial footprints effectively encode the application's control flow across functions and the instruction cache working sets within each function.

Based on these insights, this work introduces Shotgun, a BTB-directed front-end prefetcher powered by a new BTB organization specialized for effective prefetching. Shotgun devotes the bulk of its BTB capacity to unconditional branches and their targets' spatial footprints. Using this information, Shotgun is able to track the application's instruction working set at a cache block granularity, enabling accurate and timely BTB-directed prefetching. Moreover, because the unconditional branches comprise just a small fraction of the application's entire branch working set, they can be effectively captured in a practical-sized BTB. Meanwhile, conditional branches are maintained in a separate small-capacity BTB. By exploiting prior observations on control flow commonality in instruction and BTB working sets [10], Shotgun prefetches into the conditional branch BTB by pre-decoding cache lines brought into the L1-I through the use of spatial footprints. In doing so, Shotgun achieves a high hit rate in the conditional branch BTB despite its small size.

Using a diverse set of server workloads, we make the following contributions:

- Demonstrate that limited BTB capacity inhibits timely instruction prefetching in existing BTB-directed prefetchers. This calls for BTB organizations that can map a larger portion of an application's instruction working set within a limited storage budget.
- Show that local control flow has high spatial locality and a small cache footprint. Given the target of an unconditional branch, on average, over 80% of subsequent accesses (prior to the next unconditional branch) are to cache blocks within 10 blocks of the target. This observation enables a compact spatial encoding of code regions.
- Propose a new BTB organization in which most of the capacity is dedicated to unconditional branches, which steer the global control flow, and spatially-encoded footprints of their regions.

By compactly encoding footprints of entire code regions, the proposed organization avoids the need to track a large number of conditional branches inside these regions to discover their instruction cache working set.

- Introduce Shotgun, a unified instruction cache and BTB prefetcher powered by the proposed BTB organization. By tracking a much larger fraction of an application's instruction footprint within a fixed BTB storage budget, Shotgun outperforms the state-of-the-art BTB-directed front-end prefetcher (Boomerang) by up to 14%.

2. Background 2.1 Temporal Streaming Prefetching

Over the past decade, temporal streaming [5] has been the dominant technique for front-end prefetching for servers. The key principle behind temporal streaming is to record control flow access or miss sequences and subsequently replay them to prefetch the necessary state. The general concept has been applied to both instruction cache [6] and BTB [3] prefetching, and shown to be highly effective in eliminating misses in these structures.

The principal shortcoming of temporal streaming is the need to store large amounts of metadata (hundreds of kilobytes per core) for capturing control flow history [3, 6]. To mitigate the cost, two complementary techniques have been proposed. The first is sharing the metadata across all cores executing a common workload [9]. The second is using one set of unified metadata for both instruction cache and BTB prefetching, thus avoiding the cost and complexity of maintaining two separate control flow histories [10]. The key insight behind unified front-end prefetching is that the metadata necessary for populating the BTB can be extracted from cache blocks containing the associated branch instructions. Thus, history needs to be maintained only for instruction prefetching, while BTB prefetching happens "for free", storage-wise.

The state-of-the-art in temporal streaming combines the two ideas into a unified front-end prefetcher called Confluence [10]. Confluence maintains only the L1-I history metadata for both instruction and BTB prefetching, virtualizes it into the LLC and shares it across the cores executing a common workload. While effective, Confluence introduces a significant degree of cost and complexity into a processor. LLC virtualization requires invasive LLC modifications, incurs extra traffic for metadata movement and necessitates system software support to pin the cache lines containing the history metadata in the LLC. Moreover, the effectiveness of metadata sharing diminishes when workloads are colocated, in which case each workload requires its own metadata, reducing the effective LLC capacity in proportion to the number of colocated workloads.

2.2 BTB-Directed Prefetching

To mitigate the exorbitant overheads incurred by temporal streaming prefetchers, recent research has revived the idea of BTB-directed (also called fetch-directed) instruction prefetching [15]. The basic idea is to leverage the BTB to discover future branches, predict the conditional ones using the branch direction predictor, and generate a stream of future instruction addresses used for prefetching into the L1-I. The key advantage of BTB-directed prefetching is that it does not require any metadata storage beyond the BTB and branch direction predictor, both of which are already present in a modern server core.

The original work on BTB-directed prefetching was limited to prefetching of instructions. Recent work has addressed this limitation by adding a BTB prefetch capability in a technique called Boomerang [13]. Boomerang uses a basic-block-oriented BTB to detect BTB misses, which it then fills by fetching and decoding the necessary cache lines from the memory hierarchy. By adding a BTB prefetch capability without introducing new storage, Boomerang enables a unified front-end prefetcher at near-zero hardware cost compared to a baseline core.

While highly effective on workloads with smaller instruction working sets, Boomerang's effectiveness is reduced when instruction working sets are especially large. The branch footprint in such workloads can easily exceed the capacity of a typical BTB by an order of magnitude, resulting in frequent BTB misses. Whenever each BTB miss occurs, Boomerang stalls instruction prefetching to resolve the miss and uncover subsequent control flow. When the active branch working set is much larger than the BTB capacity, the BTB will thrash, resulting in a chain of misses whenever control flow transfers to a region of code not in the BTB. Such a cascade of BTB misses impedes Boomerang's ability to issue instruction cache prefetches due to frequently unresolved control flow. Thus, Boomerang's effectiveness is tightly coupled to its ability to capture the control flow in the BTB.

2.3 Competitive Analysis

Figure 5:
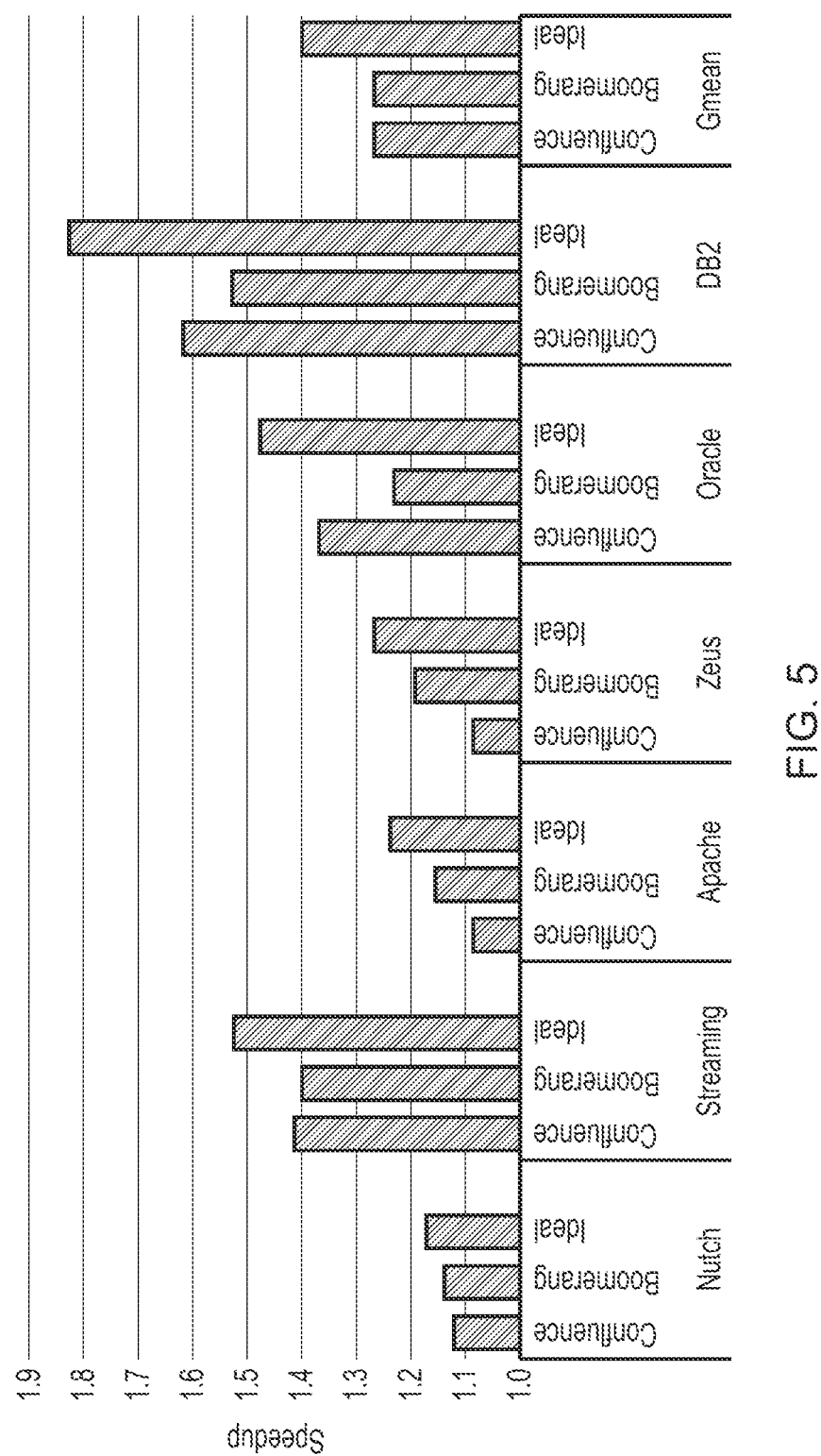
FIG. 5 schematically illustrates simulation results providing a comparison of state-of-the-art unified frontend prefetchers to an ideal front-end on server workloads.

FIG. 5 compares the performance of the state-of-the-art temporal streaming (Confluence) and BTB-directed (Boomerang) prefetchers. Complete workload and simulation parameters can be found in Section 5. As the figure shows, on workloads with smaller instruction working sets, such as Nutch and Zeus, Boomerang matches or outperforms Confluence by avoiding the latter's reliance on the LLC for metadata accesses. In Confluence, the latency of these accesses is exposed on each L1-I miss, which resets the prefetcher and incurs a round-trip to the LLC to fetch new history before prefetching can resume.

In contrast, on workloads with larger instruction working sets, such as Oracle and DB2, Confluence handily outperforms Boomerang by 14% and 9%, respectively. On these workloads, Boomerang experiences the highest BTB miss rates of any in the evaluation suite (see Table 1), which diminishes prefetch effectiveness as explained in the previous section.

TABLE 1

| Workload | MPKI |
| --- | --- |
| Nutch | 2.5 |
| Streaming | 14.5 |
| Apache | 23.7 |
| Zeus | 14.6 |
| Oracle | 45.1 |
| DB2 | 40.2 |

Given that software trends point in the direction of larger code bases and deeper call stacks [8], there is a need for a better control flow delivery architecture that can enable prefetching for even the largest instruction working sets without incurring prohibitive storage and complexity costs.

3. BTB: Code Meets Hardware

To maximize the effectiveness of BTB-directed prefetching, we next study the interplay between software behaviour and the BTB.

3.1 Understanding Control Flow

Application code is typically organized as a collection of functions to increase code reusability and productivity. The function body itself can be thought of as a contiguous region of code that spans a small number of adjacent cache blocks, as small functions are favored by modular design and software engineering principles. To achieve the desired functionality, execution is steered between different code regions through function calls, system calls and the corresponding return instructions; collectively, we refer to these as global control flow. Meanwhile, local control flow guides the execution within a code region using a combination of conditional branches and fall-through (next sequential instruction) execution.

FIG. 2 shows a cartoon example of three code regions and the two types of control flow. Global control flow that transfers execution between the regions is depicted by solid arrows, which correspond to "call" and "return" instructions. Meanwhile, local control flow transfers due to conditional branches within the code regions are shown with dashed arrows.

Local control flow tends to have high spatial locality as instructions inside a code region are generally stored in adjacent cache blocks. Furthermore, conditional branches that guide local control flow tend to have very short displacements, typically within a few cache blocks [13], as shown by dashed arrows in FIG. 2. Thus, even for larger functions, there is high spatial locality in the set of instruction cache blocks being accessed within the function.

Figure 6:
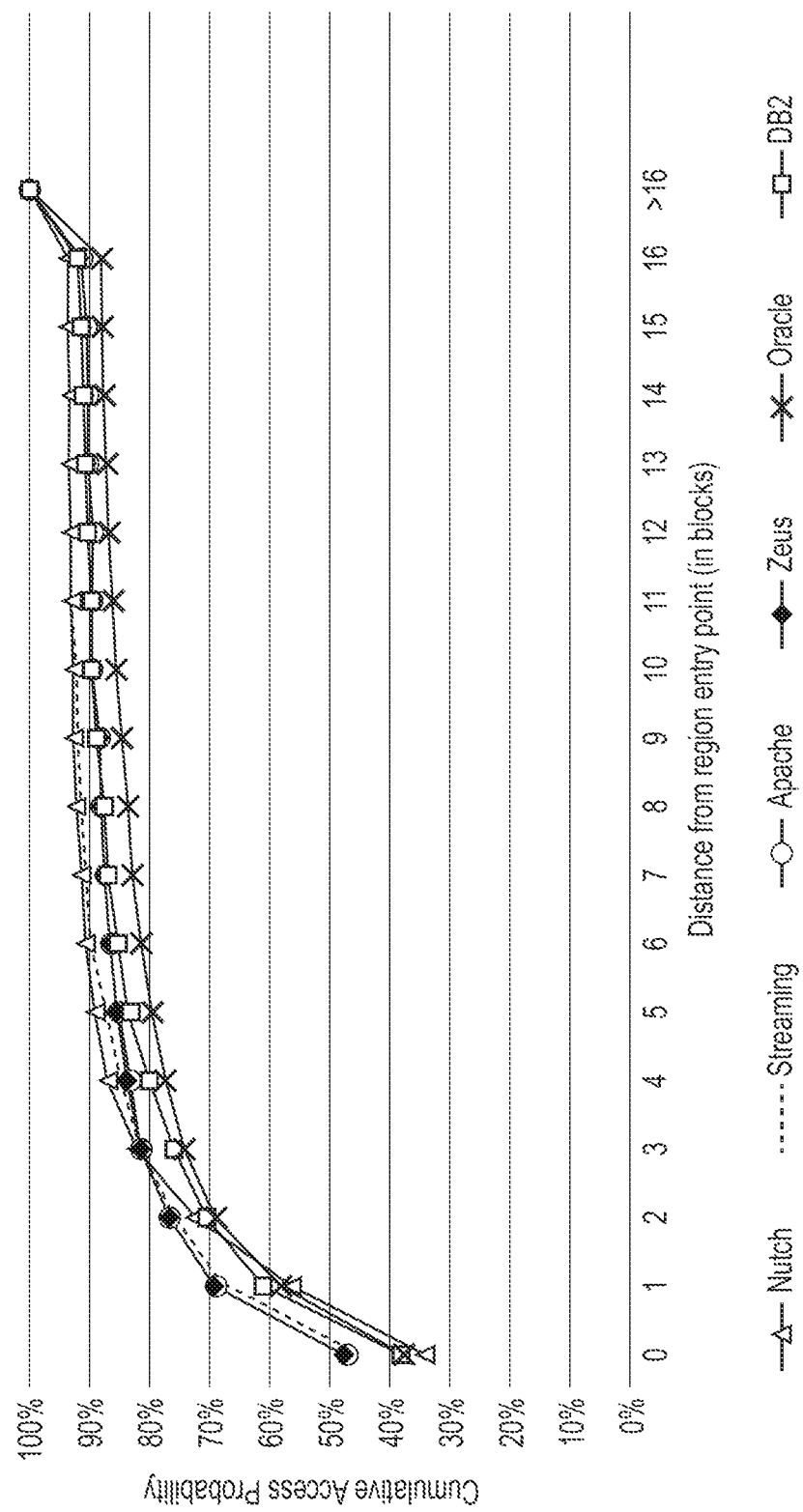
FIG. 6 schematically illustrates simulation results showing a plot of cumulative access probability against distance from a region entry point (in blocks) to show an instruction cache block access distribution inside certain code regions.

FIG. 6 quantifies the spatial locality for a set of server workloads. The figure shows the probability of an access to a cache block in relation to its distance from an entry point to a code region, where a code region is defined as a set of cache blocks spanning two unconditional branches (region entry and exit points) in dynamic program order. As the figure shows, regions tend to be small and with high spatial locality: 90% of all accesses occur within 10 cache blocks of the region entry point.

Figure 7:
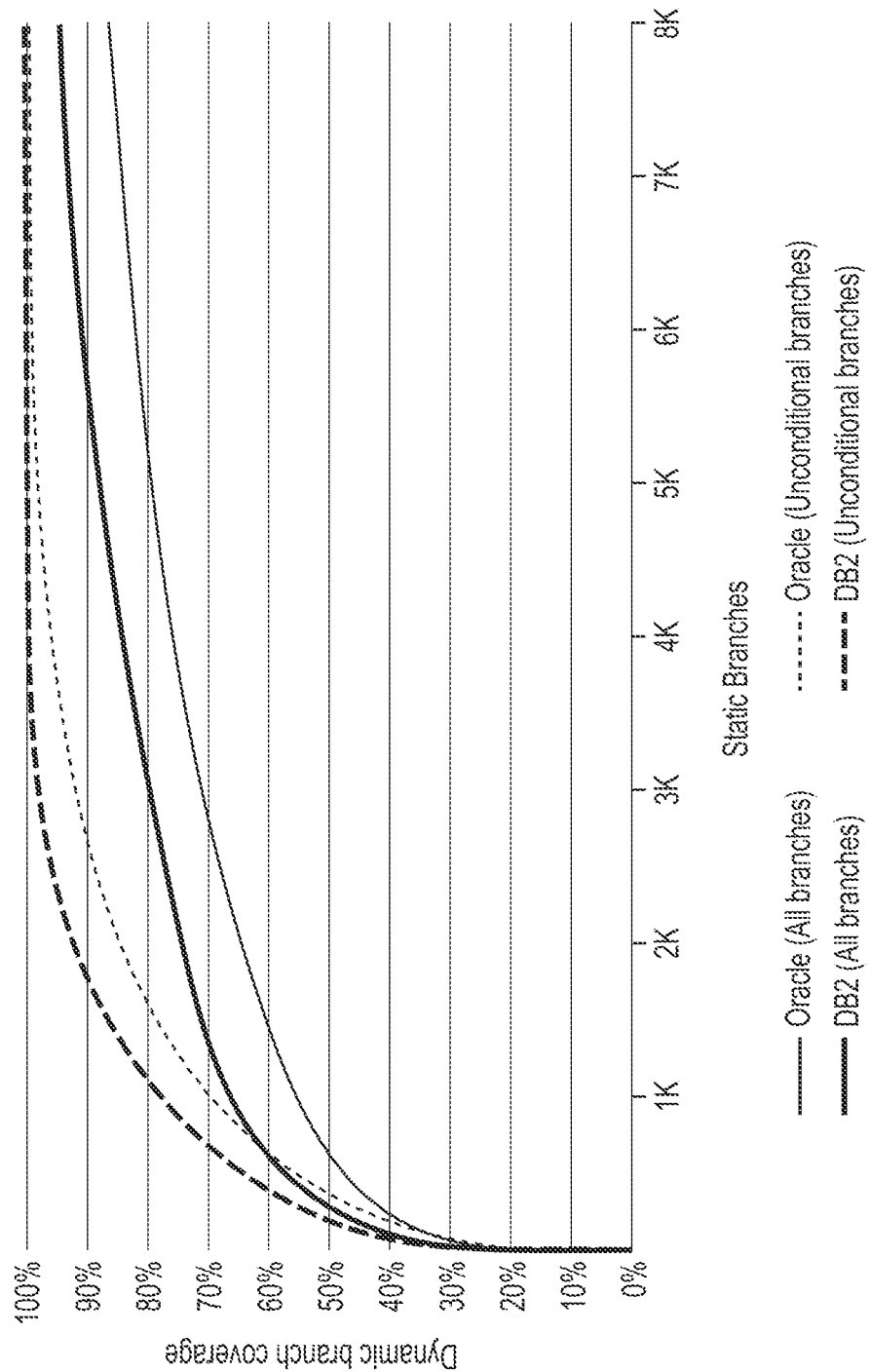
FIG. 7 schematically illustrates a plot of dynamic branch coverage against a number of static branches (in units of thousands of branches) and simulation results showing a contribution of static branches towards dynamic branch execution for Oracle and DB2 program applications.

Finally, we demonstrate that the total branch working set of server workloads is large but the unconditional branch working set is relatively small. As shown in FIG. 7, for Oracle, accommodating 90% of all dynamic branches is not possible even by tracking 8K hottest static branches. With a practical-sized BTB of 2K entries, only 65% of Oracle's dynamic branches can be covered. Meanwhile, the unconditional branch working set, responsible for the global control flow, is rather modest because conditional branches that guide application logic within code regions dominate. On Oracle, a 2K-entry BTB can capture 84% of all dynamically-occurring unconditional branches; increasing the capacity to 2.75K can cover 90% of dynamic unconditional branch executions. The trend is similar on the DB2 workload, for which 2K hottest static branches can cover only 75% of the total dynamic branches, whereas the same number of hottest unconditional branches cover 92% of the unconditional dynamic branches.

3.2 Implications for BTB-Directed Prefetching

BTB-directed prefetchers rely on the BTB to discover control flow transfer points between otherwise sequential code sections. Correctly identifying these transfer points is essential for accurate and timely prefetching. Unfortunately, large branch working sets in server workloads cause frequent BTB misses. Existing BTB-directed prefetchers handle BTB misses in one of two ways:

1) The original FDIP technique [15] speculates through the misses, effectively fetching straight line code when a branch goes undetected; this, however, is ineffective if the missing branch is a global control flow transfer that redirects execution to a new code region.

2) The state-of-the-art proposal, Boomerang, stalls prefetching and resolves the BTB miss by probing the cache hierarchy. While effective for avoiding pipeline flushes induced by the BTB miss, Boomerang is limited in its ability to issue instruction prefetches when faced with a cascade of BTB misses inside a code region as explained in Sec 2.2.

We thus conclude that effective BTB-directed prefetching involves two elements: (1) identifying global control flow transfer points, and (2) racing through local code regions unimpeded. Existing BTB-directed prefetchers are able to achieve only one of these goals at the expense of the other. The next section will describe a new BTB organization that facilitates both of these objectives.

4. Shotgun

Shotgun is a unified BTB-directed instruction cache and BTB prefetcher. Its key innovation is using the BTB to maintain a logical map of the program's instruction footprint using software insights from Sec 3. The map allows Shotgun to incur fewer BTB-related stalls while staying on the correct prefetch path, thus overcoming a key limitation of prior BTB-directed prefetchers.

Shotgun devotes the bulk of its BTB capacity to tracking the global control flow; this is captured through unconditional branches that pinpoint the inter-region control flow transfers. For each unconditional branch, Shotgun maintains compact metadata to track the spatial footprint of the target region, which enables bulk prefetching of cache blocks within the region. In contrast, prior BTB-directed prefetchers had to discover intra-region control flow by querying the BTB one branch at a time. Because unconditional branches represent a small fraction of the dynamic branch working set and because the spatial footprints summarize locations of entire cache blocks (which are few) and not individual branches (which are many), Shotgun is able to track a much larger instruction footprint than a traditional BTB with the same storage budget.

4.1 Design Overview

Shotgun relies on a specialized BTB organization that judiciously uses the limited BTB capacity to maximize the effectiveness of BTB-directed prefetching. Shotgun splits the overall BTB storage budget into dedicated BTBs for capturing global and local control flow. Global control flow is primarily maintained in the U-BTB, which tracks the unconditional branch working set and also stores the spatial footprints around the targets of these branches. The U-BTB is the heart of Shotgun and drives the instruction prefetch engine. Conditional branches are maintained in the C-BTB, which is comprised of just a few hundred entries to track the local control flow within the currently-active code regions. Finally, Shotgun uses a third structure, called Return Instruction Buffer (RIB), to track return instructions; while technically part of the global (unconditional) branch working set, returns use significantly less BTB metadata than other unconditional branches, so allocating them to a separate structure allows for a judicious usage of the limited BTB storage budget. FIG. 3A shows the three BTBs and the per-entry metadata in each of them.

For L1-I prefetching, Shotgun extends Boomerang to leverage the separate BTBs and the spatial footprints as follows: whenever Shotgun encounters an unconditional branch, it reads the spatial footprint of the target region from the U-BTB and issues prefetch probes for the corresponding cache blocks. For filling the BTBs, Shotgun takes a hybrid approach by incorporating the features from both Boomerang [13] and Confluence [10]. Specifically, while prefetching instruction blocks from LLC, Shotgun leverages the proactive BTB fill mechanism of Confluence to predecode the prefetched blocks and fill the BTB before the entries are accessed. Should a BTB miss be encountered by the front-end despite the proactive fill mechanism, it is resolved using the reactive BTB fill mechanism of Boomerang that fetches the associated cache block from the memory hierarchy and extracts the necessary branch metadata.

4.2 Design Details

4.2.1 BTB Organization

We now detail the microarchitecture of Shotgun's three BTBs, which are shown in FIG. 3A.

Unconditional branch BTB (U-BTB): The U-BTB tracks the unconditional branch working set, the spatial footprints for the target and, when applicable, return regions of these branches. Because unconditional branches and their spatial footprints are critical for prefetching, Shotgun devotes the bulk of total BTB storage budget to the U-BTB.

Each U-BTB entry, as shown in FIG. 3A, is comprised of the following fields:

Tag: the branch identity.

Size: the size of the basic block containing the branch (like Boomerang, Shotgun uses a basic-block-oriented BTB [20]). {Here, a basic block means a sequence of straight-line instructions ending with a branch instruction; slightly different from a conventional definition of single-entry single-exit straight-line code}.

Type: the type of branch instruction (call, jump, etc.).

Target: the target address of the branch instruction.

Call Footprint: the spatial footprint for the target region of a call or unconditional jump instruction.

Return Footprint: the spatial footprint for the target region of a return instruction as explained next.

Because a function may be called from different sites, the footprint associated with a return instruction is call-site-dependent. Meanwhile, tracking potentially many footprints for each return instruction is impractical. To resolve this conundrum, Shotgun leverages a simple observation that the target region of a particular instance of a return is, in fact, the fall-through region of the preceding call (static code region immediately following the call). Therefore, Shotgun associates the spatial footprint of the return region with the entry of the corresponding call instruction in the U-BTB. To support this design, each U-BTB entry may maintain two spatial footprints; one for the target region of the call and the other for the return region.

Return Instruction Buffer (RIB): Shotgun employs a dedicated storage structure, RIB, to track return instructions corresponding to function and trap returns. Storing returns in the U-BTB along with other unconditional branches would result in severe storage under-utilization because the majority of U-BTB entry space is not needed for returns. For example, returns read their target address from Return Address Stack (RAS) instead of the Target field of U-BTB entry. Similarly, as discussed above, the spatial footprint for return target region is stored along with the corresponding call. Together, these fields (Target, Call Footprint, and Return Footprint) account for more than 50% of a U-BTB entry storage. The impact of such space under-utilization is significant because returns occupy a significant fraction of U-BTB entries. Indeed, our studies show that 25% of U-BTB entries are occupied by return instructions, hence resulting in storage inefficiency. Note that with a conventional BTB, allocating the return instructions into the BTB does not lead to a high inefficiency because over 70% of BTB entries are occupied by conditional branches, while returns are responsible for fewer than 10% of all entries.

These observations motivate Shotgun's use of a dedicated RIB structure to track return instructions. As shown in FIG. 3A, each RIB entry contains only (1) Tag, (2) Type, and (3) Size fields. Compared to a U-BTB entry, there are no Target, Call Footprint, and Return Footprint fields in a RIB entry.

Thus, by storing only the necessary and sufficient metadata to track return instructions, RIB avoids wasting U-BTB capacity.

Conditional branch BTB (C-BTB): Shotgun incorporates a small C-BTB to track the local control flow (conditional branches) of currently active code regions. As shown in FIG. 3A, a C-BTB entry is composed of (1) Tag, (2) Size, (3) Direction, and (4) Target fields. A C-BTB entry does not contain branch Type field as all the branches are conditional. As explained in Section 4.2.3, Shotgun aggressively prefetches into the C-BTB by exploiting spatial footprints, which affords a high hit rate in the C-BTB with a capacity of only a few hundred entries.

4.2.2 Recording Spatial Footprints

Shotgun monitors the retire instruction stream to record the spatial footprints. As an unconditional branch represents the entry point of a code region, Shotgun starts recording a new spatial footprint on encountering an unconditional branch in the retire stream. Subsequently, it tracks the cache block addresses of the following instructions and adds them to the footprint if not already present. The spatial footprint recording for a code region terminates on encountering a subsequent unconditional branch, which indicates entry to a different code region. Once the recording terminates, Shotgun stores the footprint in the U-BTB entry corresponding to the unconditional branch that triggered the recording.

Spatial footprint format: A naive approach to record a spatial footprint would be to record the full addresses of all the cache blocks accessed inside a code region. Clearly, this approach would result in excessive storage overhead due to the space requirements of storing full cache block addresses. A storage efficient alternative would be to record only the entry and exit points of the region and later prefetch all the cache blocks between these points. However, as not all the blocks in a region are accessed during execution, prefetching the entire region would result in over prefetching, potentially leading to on-chip network congestion and cache pollution.

To achieve both precision and storage-efficiency, Shotgun leverages the insight that the accesses inside a code region are centered around the target block (first block accessed in the region) as discussed in Sec 3. To exploit the high spatial locality around the target block, Shotgun uses a short bit-vector, where each bit corresponds to a cache block, to record spatial footprints. The bit positions in the vector represent the relative distance from the target block and the bit value (1 or 0) indicates whether the corresponding block was accessed or not during the last execution of the region. Thus, by using a single bit per cache block, Shotgun dramatically reduces storage requirements while avoiding over prefetching.

4.2.3 Prefetching with Shotgun

Similar to FDIP [15], Shotgun also employs a Fetch Target Queue(FTQ), as shown in FIG. 3A, to hold the fetch addresses generated by the branch prediction unit. These addresses are later consumed by the fetch-engine to fetch and feed the corresponding instructions to core back-end. To fill the FTQ, the branch prediction unit of Shotgun queries all three BTBs (U-BTB, C-BTB, and RIB) in parallel. If there is a hit in any of the BTBs, the appropriate fetch addresses are inserted in to the FTQ. As these addresses are eventually going to be used for fetching instructions from L1-I, they represent natural prefetching candidates. Therefore, like FDIP, Shotgun capitalizes on this opportunity by scanning through the fetch addresses, as they are inserted into the FTQ, and issuing prefetch probes for corresponding L1-I blocks.

On a U-BTB or RIB hit, Shotgun also reads the spatial footprint of the target code region to issue L1-I prefetch probes for appropriate cache blocks. Accessing the spatial footprint is simple for U-BTB hits because it is directly read from the Call Footprint field of the corresponding U-BTB entry. However, the mechanism is slightly more involved on RIB hits because the spatial footprint (when optionally used) is not stored in RIB, rather in the U-BTB entry of the corresponding call. To find this U-BTB entry, we extend the RAS such that on a call, in addition to the return address that normally gets pushed on the RAS, the address of basic block containing the call is also pushed. {Because Shotgun uses a basic-block oriented BTB, it is the basic block address, and not the PC, corresponding to the call instruction that is stored on the RAS.} Because the RAS typically contains a small number of entries (8-32 is common), the additional RAS storage cost to support Shotgun is negligible. On a RIB hit for a return instruction, Shotgun pops the basic block address of the associated call from the RAS to index the U-BTB and retrieve the spatial footprint from the Return Footprint field.

In addition to using the spatial footprint to prefetch instructions into the L1-I, Shotgun exploits control flow commonality [10] to prefetch into the C-BTB as well. Thus, when the prefetched blocks arrive at the L1-I, Shotgun uses a set of predecoders to extract branch metadata from them and uses it to populate the C-BTB ahead of the access stream. By anticipating the upcoming instruction working set via the spatial footprints and prefetching its associated branch working set into the C-BTB via predecoding, Shotgun affords a very small yet highly effective C-BTB.

FIG. 3A shows a working example of using a spatial footprint for L1-I and C-BTB prefetching on a U-BTB hit. Shotgun first reads the target address "A" and the call footprint "01001000" from the U-BTB entry. It then generates prefetch probes to the L1-I for the target block "A" and, based on the call footprint in the U-BTB entry, for cache blocks "A+2" and "A+5" (step ①). If any of these blocks are not found in the L1-I, Shotgun issues prefetch request(s) to the LLC (step {2}). Once prefetched blocks arrive from the LLC, they are installed in the L1-I (step {3}) and are also forwarded to a predecoder (step {4}). The predecoder extracts the conditional branches from the prefetched blocks and inserts them into the C-BTB (step {5}).

If Shotgun detects a miss in all three BTBs, it invokes Boomerang's BTB fill mechanism to resolve the miss in the following manner: first, the instruction block corresponding to the missed branch is accessed from L1-I or from lower cache levels if not present in the L1-I.

The block is then fed to the predecoder that extracts the missing branch and stores it into one the BTBs depending on branch type. The rest of the predecoded branches are stored in the BTB Prefetch Buffer [13]. On a hit to the BTB Prefetch Buffer, the accessed branch is moved to the appropriate BTB based on the branch type.

4.3 Discussion

Similar to Shotgun, two previously proposed techniques, pTask [7] and (RDIP) [12]), also leverage global control flow information for prefetching; but unlike Shotgun, they target only L1-I misses. Moreover, pTask initiates prefetching only on OS context switches and requires software support. RDIP is closer to Shotgun as it also exploits global program context captured by RAS for prefetching. However, there are important differences between the two approaches. First, RDIP, for timely prefetching, predicts the future program context (next call/return instruction) solely based on the current context. This approach ignores local control flow in predicting the future execution path, which naturally limits accuracy. Shotgun, on the the other hand, predicts each and every branch to locate the upcoming code region. Therefore, Shotgun is more accurate in discovering future code regions and L1-I accesses. Second, RDIP targets only a part of the overall front-end bottleneck as it prefetches only L1-!blocks but does not prefill BTB. Meanwhile, Shotgun offers a cohesive solution to the entire problem. Finally, RDIP incurs a high storage cost, 64 KB per core, as it has to maintain dedicated metadata for L1-I prefetching. Shotgun, in contrast, typically has no additional storage requirement, as it captures the global control flow and spatial footprints inside the storage budget of a conventional BTB.

5 Methodology 5.1 Simulation Infrastructure

We use Flexus [18], a full system multiprocessor simulator, to evaluate Shotgun on a set of enterprise and open-source scale-out applications listed in Table 2 in FIG. 8. Flexus, which models SPARC v9 ISA, extends the Simics functional simulator with out-of-order(OoO) cores, memory hierarchy, and on-chip interconnect. We use SMARTS [19] multiprocessor sampling methodology for sampled execution. Samples are drawn over 32 billion instructions (2 billion per core) for each application. At each sampling point, we start cycle accurate simulation from checkpoints that include full architectural and partial microarchitectural state consisting of caches, BTB, branch predictor, and prefetch history tables. We warm-up the system for 100K cycles and collect statistics over the next 50K cycles. We use the ratio of number of application instructions to the total number of cycles (including the cycles spent executing operating system core) to measure performance. This metric has been shown to be an accurate measure of server throughput [18].

Our modelled processor is a 16-core tiled CMP. Each core is 3-way out-of-order that microarchitecturally resembles an ARM Cortex-A57 core. The microarchitectural parameters of the modelled processor are listed in Table 3 in FIG. 8. We assume a 48-bit virtual address space.

5.2 Control Flow Delivery Mechanisms

We compare the efficacy and storage overhead of the following state-of-the-art control flow delivery mechanisms.

Confluence: Confluence is the state-of-the-art temporal streaming prefetcher that uses unified metadata to prefetch into both L1-I and BTB [10]. To further reduce metadata storage costs, Confluence virtualizes the history metadata into the LLC using SHIFT [9]. We model Confluence as SHIFT augmented with a 16K-entry BTB, which was shown to provide a generous upper bound on Confluence's performance [10]. To provide high L1-I and BTB miss coverage, Confluence requires at least a 32K-entry instruction history and an 8K-entry index table, resulting in high storage overhead. Furthermore, it adds significant complexity to the processor as it requires LLC tag extensions, reduction in effective LLC capacity, pinning of metadata cache lines in the LLC and the associated system software support, making it an expensive proposition as shown in prior work [13]. The LLC tag array extension, for storing index table, costs 240 KB of storage overhead, whereas the history table for each colocated workload require 204 KB of storage which is carved out from LLC capacity.

Boomerang: As described in Section 2.2, Boomerang employs FDIP for L1-I prefetching and augments it with BTB prefilling. Like FDIP, Boomerang employs a 32-entry fetch target queue (FTQ) to buffer the instruction addresses before they are consumed by the fetch engine. We evaluate Boomerang with a 2K entry basic-block oriented BTB. Each BTB entry consists of a 37-bit tag, 46-bit target address, 5 bits for basic-block size, 3 bits for branch type (conditional, unconditional, call, return, and trap return), and 2 bits for conditional branch direction prediction. In total, each BTB entry may include 93 bits leading to an overall BTB storage cost of 23.25 KB. Also, our evaluated Boomerang design employs a 32-entry BTB prefetch buffer.

Shotgun: As described in Section 4.2, Shotgun uses dedicated BTBs for unconditional branches, conditional branches, and returns. For a fair comparison against Boomerang, we restrict the combined storage budget of all BTB components in Shotgun to be identical to the storage cost of Boomerang's 2K-entry BTB. Like Boomerang, Shotgun also employs a 32-entry FTQ and a 32-entry BTB prefetch buffer.

U-BTB storage cost: We evaluate a 1.5K (1536) entry U-BTB, which accounts for the bulk of Shotgun's BTB storage budget. Each U-BTB entry consists of a 38-bit tag, 46-bit target, 5 bits for basic-block size, and 1 bit for branch type (unconditional or call). Furthermore, each U-BTB entry also consists of two 8-bit vectors for storing spatial footprints. In each spatial footprint, 6 of the 8 bits are used to track the cache blocks after the target block and the other two bits for the blocks before the target block. Overall, each U-BTB entry costs 106 bits, resulting in a total storage of 19.87 KB.

C-BTB storage cost: Since Shotgun fills C-BTB from L1-I blocks prefetched via U-BTB's spatial footprints, only a small fraction of overall BTB storage is allocated to C-BTB. We model a 128-entry C-BTB with each C-BTB entry consisting of a 41-bit tag, 22-bit target offset, 5 bits for basic-block size, and 2 bits for conditional branch direction prediction. Notice that only a 22-bit target offset is needed, instead of the complete 46-bit target address, as conditional branches always use PC relative offsets and SPARC v9 ISA limits the offset to 22-bits. Also, as C-BTB stores only the conditional branches, the branch type field is not needed. Overall, the 128-entry C-BTB corresponds to 1.1 KB of storage.

RIB storage cost: We model a 512-entry RIB, with each entry containing a 39-bit tag, 5 bits for basic-block size, and 1 bit for branch type (return or trap-return). Since return instructions get their target from the RAS, the RIB does not store target addresses (Section 4.2). With 45 bits per each RIB entry, a 512-entry RIB uses 2.8 KB of storage.

Total: The combined storage cost of U-BTB, C-BTB and RIB is 23.77 KB.

6 Evaluation

In this section, we first evaluate Shotgun's (i.e. the present technique's) effectiveness in eliminating front-end stall cycles, and the corresponding performance gains in comparison to temporal streaming (Confluence) and BTB-directed (Boomerang) control flow delivery mechanisms. Next, we evaluate the key design decisions taken in Shotgun's microarchitectural design: we start with assessing the impact of spatial footprints in front-end prefetching; we then analyze the impact of using a small C-BTB on Shotgun's performance; finally, we present a sensitivity study to the BTB storage budget.

6.1 Front-End Stall Cycle Coverage

Figure 9:
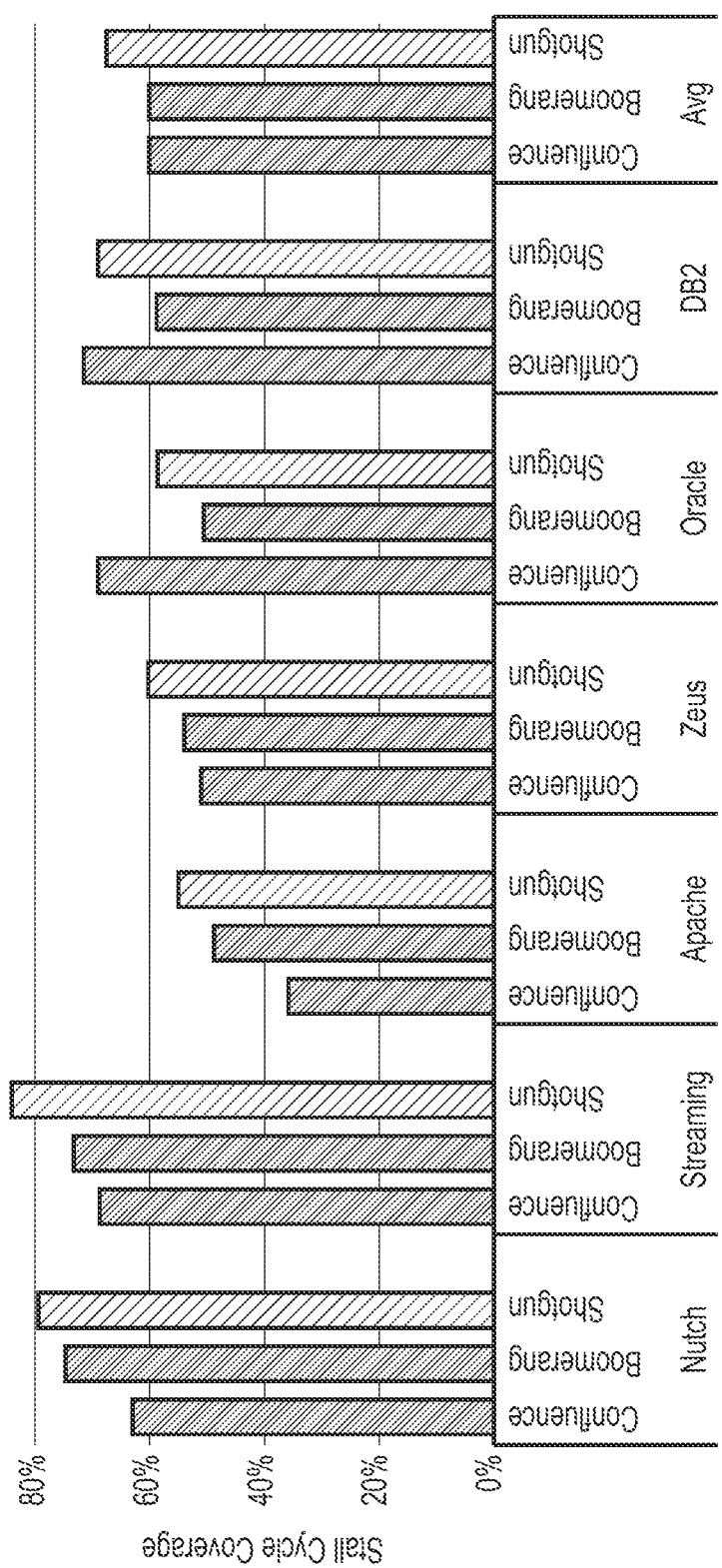
FIG. 9 schematically illustrates simulation results showing stall cycle coverage in percentage for a number of different program applications and for three different prefetch schemes including the "shotgun" prefetching scheme according to the present technique.

To assess the efficacy of different prefetching mechanisms, we present the number of front-end stall cycles covered by each of them in FIG. 9. Notice that instead of using the more common "misses covered" metric, we use "stall cycles covered"; that way, we can precisely capture the impact of "in-flight prefetches": the ones that have been issued, but the requested block has not yet arrived in L1-I when needed by the fetch unit. Furthermore, we consider stall cycles only on the correct execution path, since wrong-path stalls do not affect performance.

On average, as shown in the FIG. 9, Shotgun covers 68% of the stall cycles experienced by a no prefetch baseline; this is 8% better than each of Boomerang and Confluence. A closer inspection reveals that Shotgun outperforms its direct rival Boomerang on all of the workloads; in particular, Shotgun provides more than 10% coverage improvements on each of DB2 and Streaming, and over 8% on Oracle—these workloads have a high BTB MPKI, whose impact on front-end performance Shotgun aims to mitigate. Shotgun's improved coverage is a direct outcome of uninterrupted L1-I prefetching via U-BTB's spatial footprints; in contrast, Boomerang has to wait to resolve BTB misses.

Compared to Confluence, Shotgun provides better stall coverage on four out of six workloads. A closer inspection reveals that Shotgun comprehensively outperforms Confluence on Apache, Nutch, and Streaming with 16%-19% additional coverage. Confluence performs poorly on these applications, as also noted by Kumar et al. [13], owing to frequent LLC accesses for loading history metadata. On every misprediction in L1-I access sequence, Confluence needs to load the correct sequence from the LLC before starting issuing prefetches on the correct path. This start-up delay in issuing prefetches on each new sequence compromises Confluence's coverage.

On the workloads with the highest BTB MPKI (DB2 and Oracle), Shotgun is within 2% of Confluence on DB2, but is 10% behind on Oracle. As shown in FIG. 7, Oracle's unconditional branch working set is much larger compared to other workloads. The most frequently executed 1.5K unconditional branches (equal to the number of Shotgun's U-BTB entries) cover only 78% of dynamic unconditional branch execution. Therefore, Shotgun often enters code regions not captured by U-BTB, which limits the coverage due to not having a spatial footprint to prefetch from.

6.2 Performance Analysis

Figure 10:
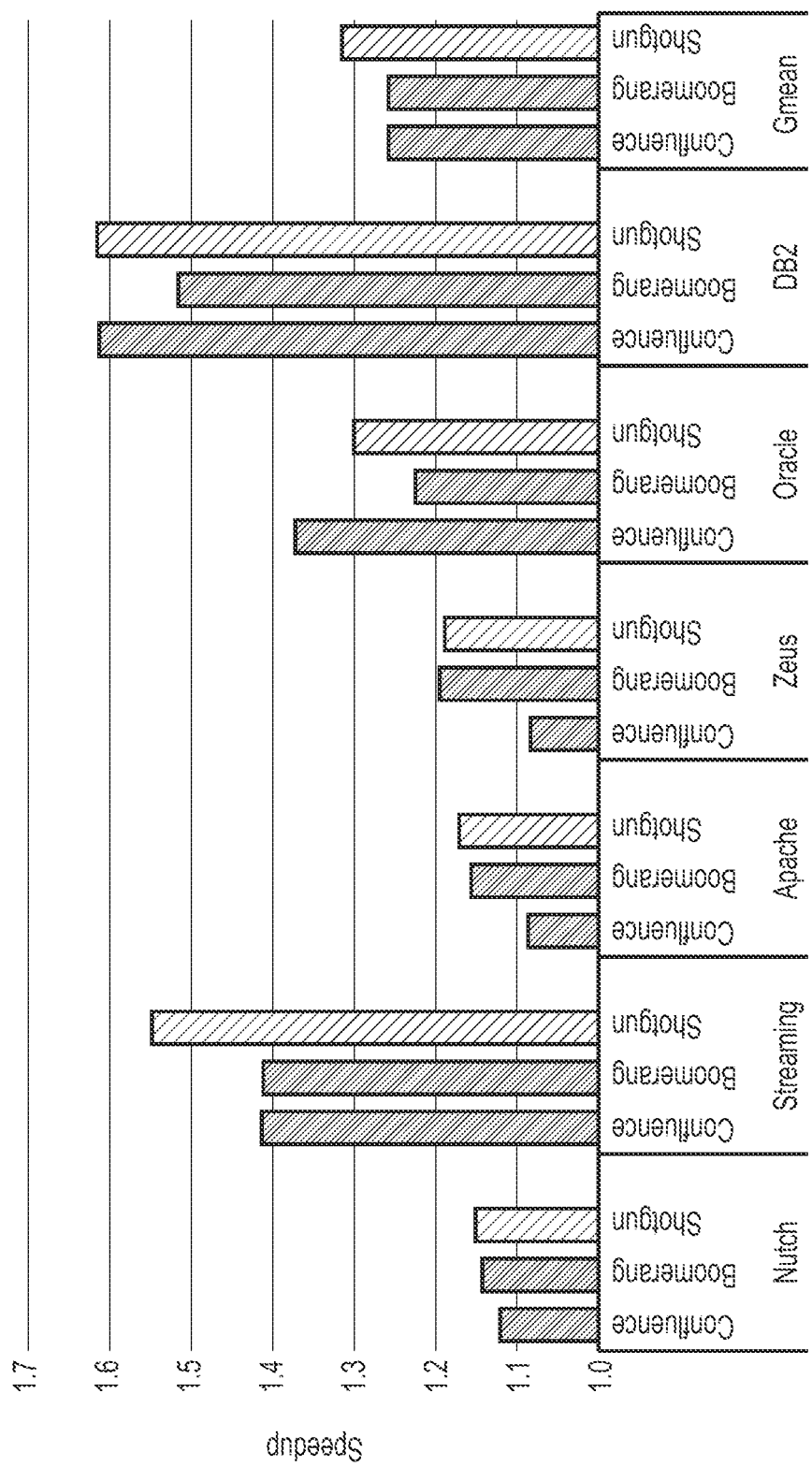
FIG. 10 schematically illustrates simulation results showing a speed-up of different prefetching schemes relative to a no-prefetch baseline for a number of different program applications and including results for the present technique.

FIG. 10 shows the performance improvements for different prefetching mechanisms over a baseline without any prefetcher. The performance trends are similar to coverage trends (FIG. 9) with Shotgun providing, on average, 32% performance improvement over the baseline and 5% improvement over each of Boomerang and Confluence. The speedup over Boomerang is especially prominent on high BTB MPKI workloads, DB2 and Oracle, where Shotgun achieves 10% and 8% improvement respectively.

Interestingly, FIG. 10 shows that Shotgun attains a relatively modest performance gain over Boomerang on Nutch, Apache, and Zeus workloads, despite its noticeable coverage improvement. The reason behind this behavior is that these workloads have relatively low L1-I MPKI; therefore, the coverage improvement does not translate into proportional performance improvement. Similar to coverage results, Shotgun outperforms Confluence on Apache, Nutch, Streaming, and Zeus. Furthermore, it matches the performance gain of Confluence on DB2; however, due to lower stall cycle coverage, Shotgun falls behind Confluence on Oracle by 7%.

6.3 Quantifying the Impact of Spatial Footprints

As discussed in Sec 4.2.2, Shotgun stores the spatial region footprints in the form of a bit-vector to reduce the storage requirements while simultaneously avoiding over prefetching. This section evaluates the impact of spatial footprints and their storage format (bit-vector) on performance. We evaluate the following spatial region prefetching mechanisms: (1) No bit vector: does not perform any region prefetching; (2) 8-bit vector; (3) 32-bit vector; (4) Entire Region: prefetch all the cache blocks between entry and exit points of the target region; and (5) 5-Blocks: prefetch five consecutive cache blocks in the target region starting with the target block. The "5-Blocks" design point is motivated by FIG. 6, which shows that 80%-90% of the accessed blocks lie within this limit. The benefit of always prefetching a fixed number of blocks is that it completely avoids the need to store metadata for prefetching.

First, we focus on the stall cycle coverage and performance with different bit-vector lengths. For the No Bit Vector design, which performs no region prefetching, we increase the number of entries in the U-BTB up to the same storage budget as the 8-bit vector design. For the 32-bit vector, however, instead of reducing the number of U-BTB entries (to account for more bits in bit-vector), we simply provide additional storage to accommodate the larger bit-vector. Therefore, the results for 32-bit vector upper-bound the benefits of tracking a larger spatial region with the same global control flow coverage in the U-BTB as the 8-bit vector design.

Figure 11:
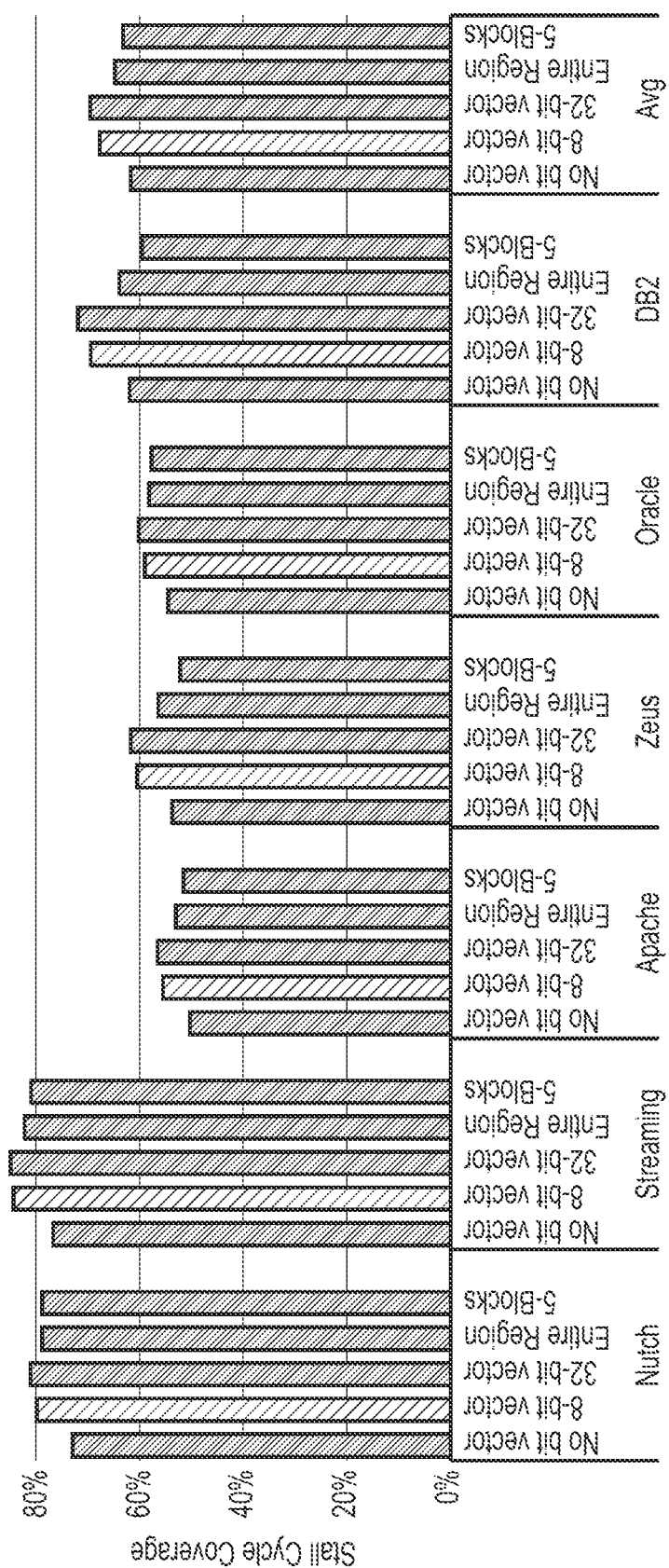
FIG. 11 schematically illustrates a front-end stall cycle coverage possible by implementing different examples of the present technique and shows a comparison of simulation results using different spatial region prefetching mechanisms.
Figure 12:
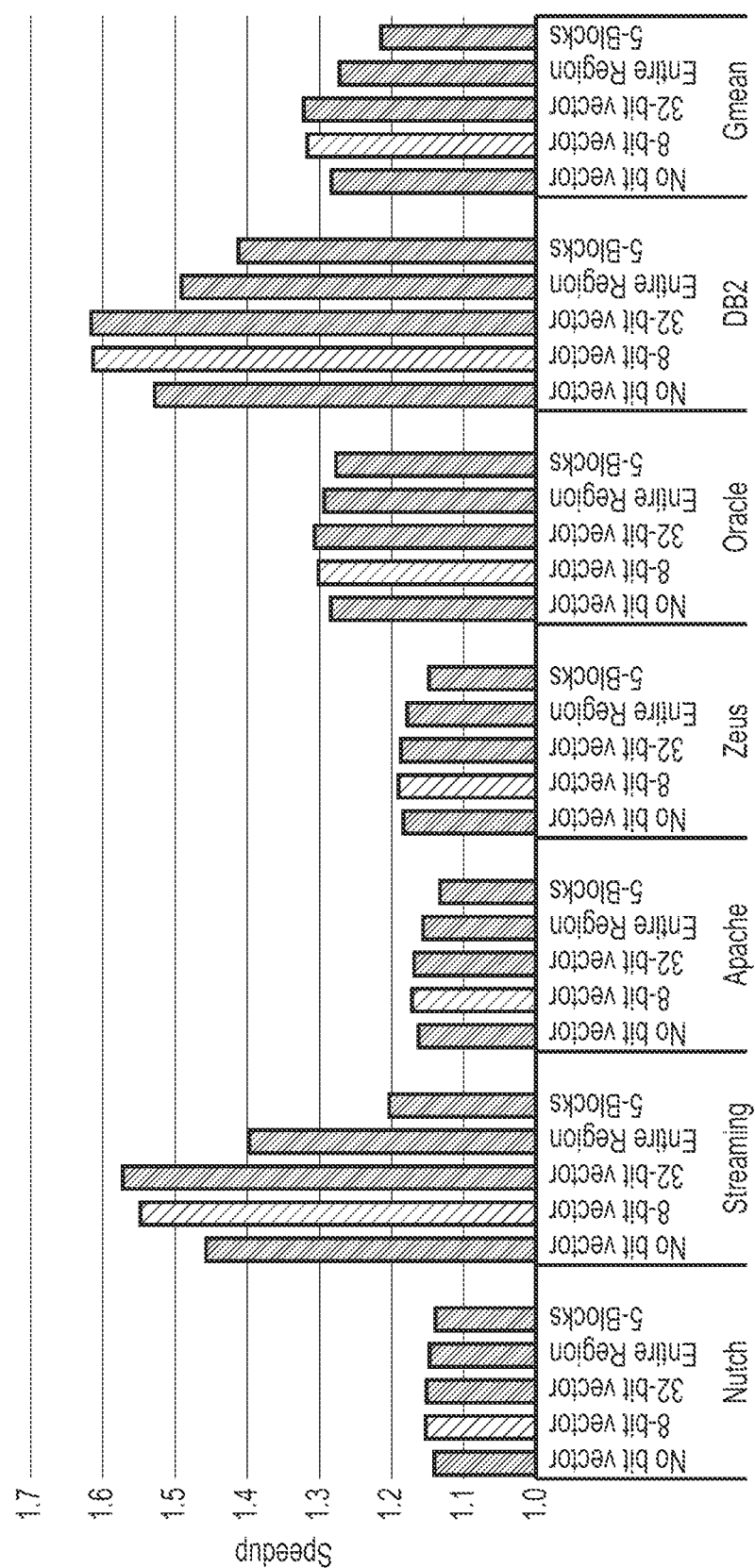
FIG. 12 schematically illustrates simulation results showing speed-up achievable for different spatial region prefetching mechanisms according to the present technique for a range of different program applications.

As FIGS. 11 and 12 show, an 8-bit vector provides, on average, 6% coverage and 4% performance benefit compared to no spatial region prefetching. In fact, without spatial footprints, Shotgun's coverage is only 2% better than Boomerang. With an 8-bit vector, Shotgun improves the performance of every single workload, with the largest gain of 9% on Streaming and DB2, compared to No Bit Vector. Meanwhile, increasing the bit-vector length to 32 bits provides only 0.5% performance, on average, over an 8-bit vector. These results suggest that longer bit vectors do not offer a favorable cost/performance trade-off.

Figure 13:
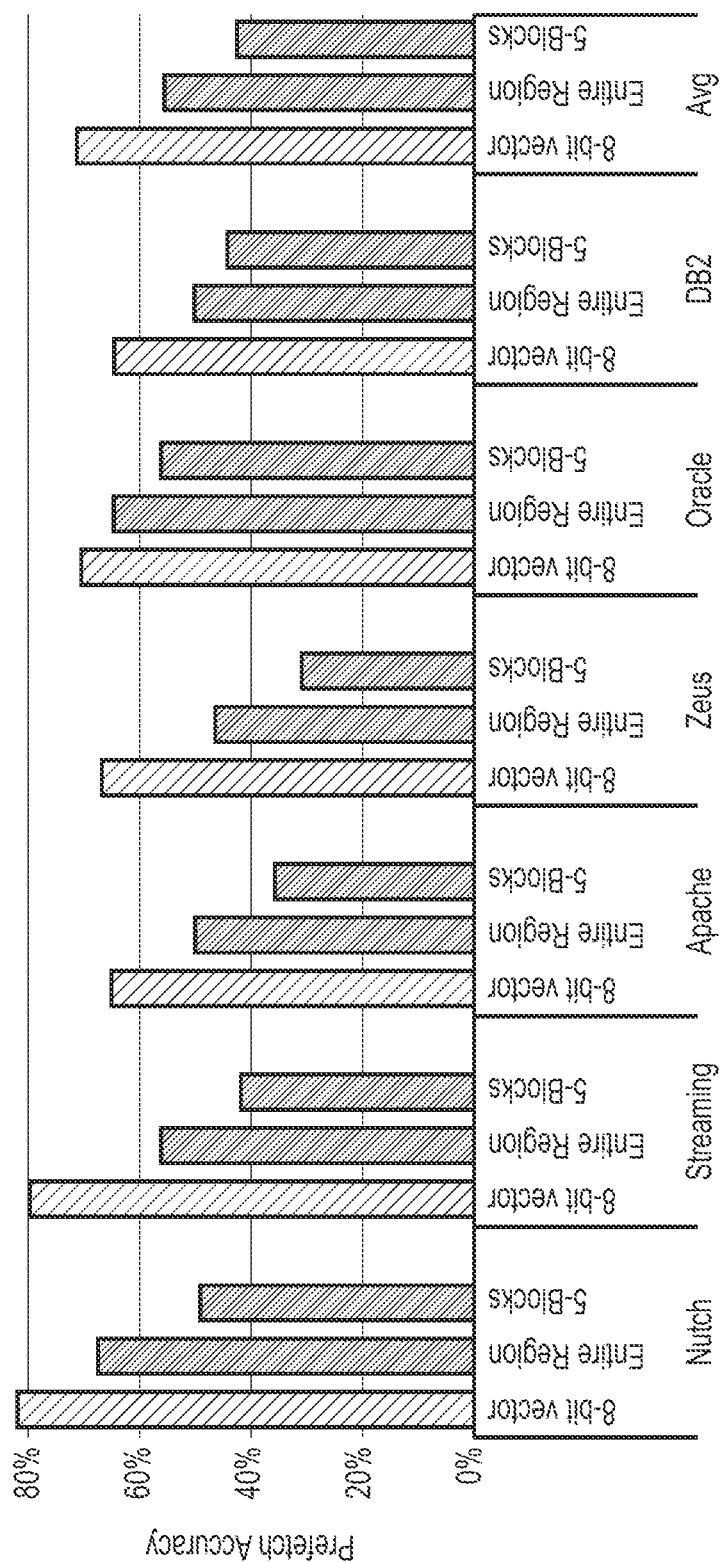
FIG. 13 schematically illustrates simulation results for prefetch accuracy in percentage for three different spatial region prefetching mechanisms and for a number of different program applications.
Figure 14:
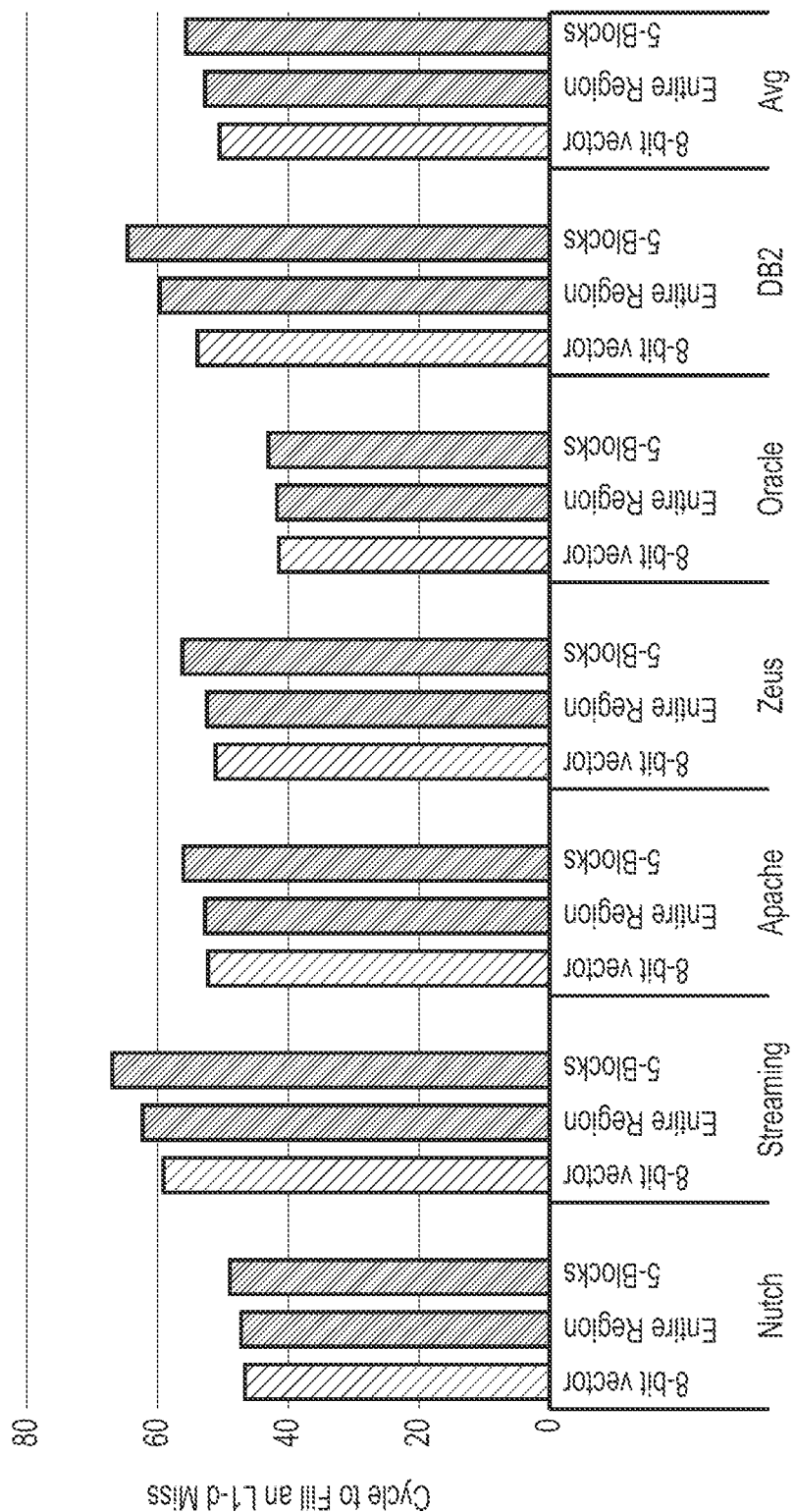
FIG. 14 schematically illustrates simulation results showing a number of cycles required to fill a level one data cache miss with different mechanisms for spatial region prefetching.

The remaining spatial region prefetching mechanisms, Entire Region and 5-Blocks, lead to a performance degradation compared to 8-bit vector as shown in FIG. 12. The performance penalty is especially severe in two of the high opportunity workloads: DB2 and Streaming. This performance degradation results from over-prefetching, as these mechanisms lack the information about which blocks inside the target region should be prefetched. Always prefetching 5 blocks from the target region results in significant over prefetching and poor prefetch accuracy, as shown in FIG. 13, because many regions are smaller than 5 blocks. The reduction in prefetch accuracy is especially severe in Streaming where it goes down to mere 42% with 5-Block prefetching compared to 80% with 8-bit vector. On average, 8-bit vector provides 71% accuracy whereas, Entire Region and 5-Blocks prefetching are only 56% and 43% accurate, respectively. Over-prefetching also increases pressure on the on-chip network, which in turn increases the effective LLC access latency, as shown in FIG. 14. For example, as the figure shows, average latency to fill an L1-D miss increases from 54 cycles with 8-bit vector to 65 cycles with 5-Blocks prefetching for DB2. The combined effect of poor accuracy and increased LLC access latency due to over-prefetching makes indiscriminate region prefetching less effective than the 8-bit vector design.

6.4 Sensitivity to C-BTB Size

Figure 15:
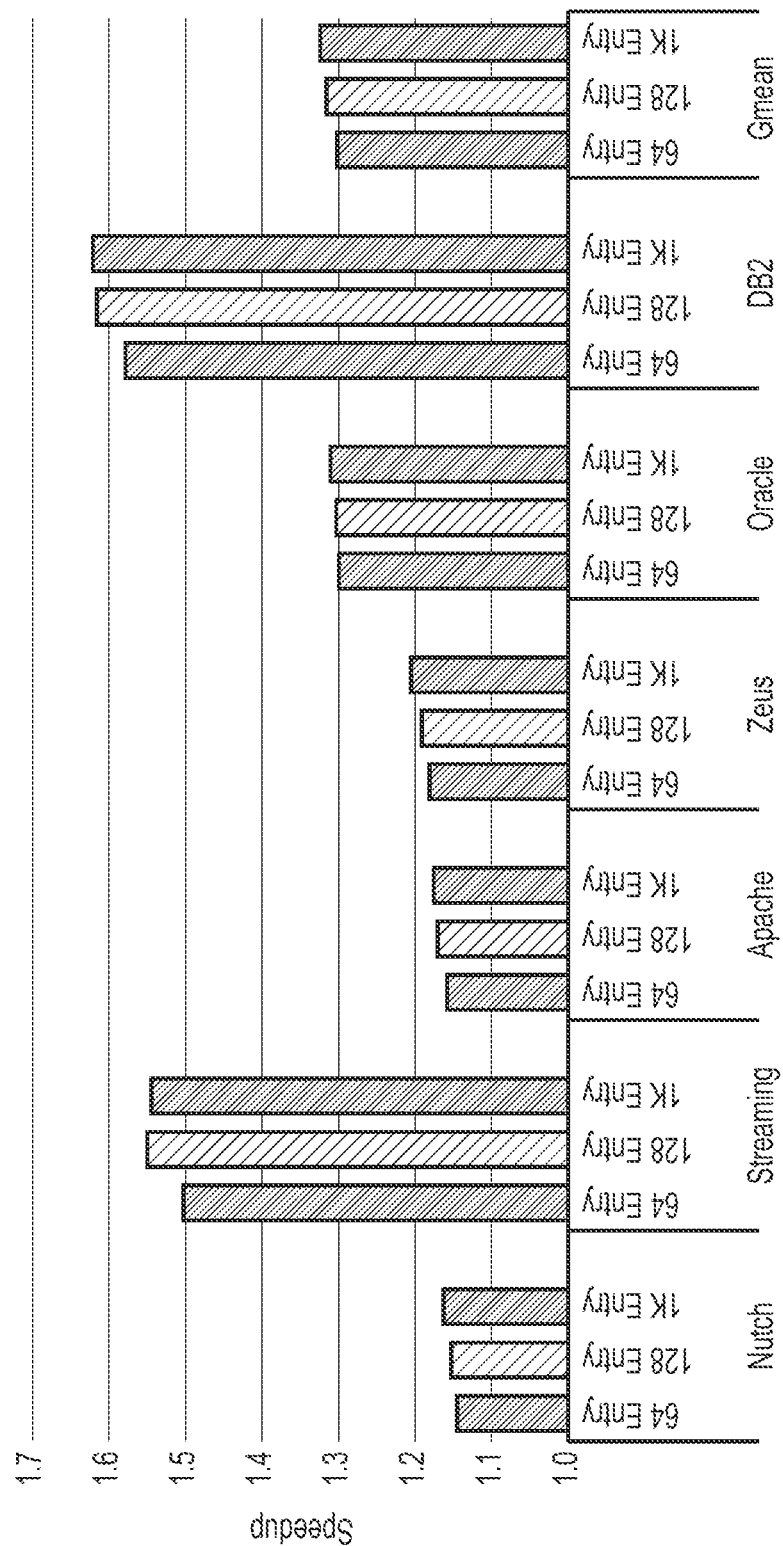
FIG. 15 schematically illustrates simulation results showing speed-ups possible using the prefetching according to the present technique using different conditional branch target buffer sizes.

As discussed in Sec 4, Shotgun incorporates a small C-BTB and relies on both proactive and reactive mechanisms to fill it ahead of time. To measure Shotgun's effectiveness in prefilling the C-BTB, FIG. 15 presents performance sensitivity to the number of C-BTB entries. Any speedup with additional entries would highlight the opportunity missed by Shotgun.

To assess Shotgun's effectiveness, we compare the performance of 128-entry verses 1K-entry C-BTBs. As the figure shows, despite an 8× increase in storage, the 1K entry C-BTB delivers, on average, only 0.8% improvement. This result validates our design choice, demonstrating that a larger C-BTB capacity is not useful.

On the other hand, reducing the number of entries to 64 results in noticeable performance loss especially on Streaming and DB2, with 4% lower performance compared to a 128-entry C-BTB. On average, the 128-entry C-BTB outperforms the 64-entry C-BTB by 2% as shown in FIG. 15.

6.5 Sensitivity to the BTB Storage Budget

We now investigate the impact of the BTB storage budget on the effectiveness of the evaluated BTB-directed prefetchers: Boomerang and Shotgun. We vary the BTB capacity from 512 entries to 8K entries for Boomerang, while using the equivalent storage budget for Shotgun. To match Boomerang's BTB storage budget in the 512- to 4K-entry range, we proportionately scale Shotgun's number of entries in U-BTB, RIB, and C-BTB from the values presented in Sec 5.2. However, scaling the number of U-BTB entries to match 8K-entry Boomerang BTB storage would lead to a 6K-entry U-BTB, which is an overkill, as 4K-entry U-BTB is sufficient to capture the entire unconditional branch working set as shown in FIG. 7. Therefore, Shotgun limits the number of U-BTB entries to 4K and expands RIB and C-BTB to store 1K and 4K entries respectively, to utilize the remaining budget. Empirically, we found this to be the preferred Shotgun configuration for the 8K-entry storage budget.

Figure 16:
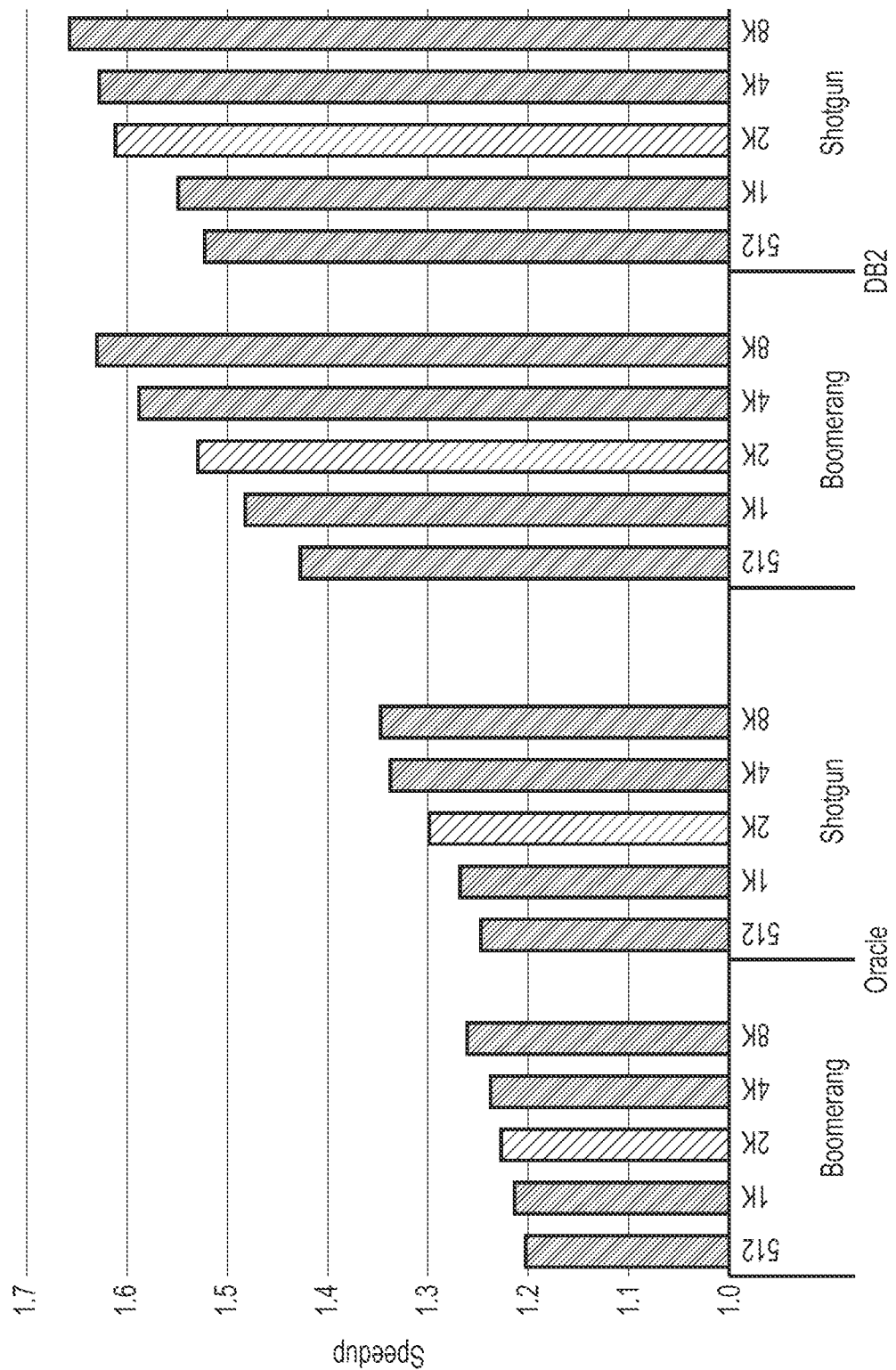
FIG. 16 schematically illustrates simulation results comparing the present technique with an earlier "Boomerang" technique for different branch target buffer sizes and using an equivalent storage budget for the two different techniques.

FIG. 16 shows the results for Oracle and DB2, the two workloads with the largest instruction footprints that are particularly challenging for BTB-based prefetchers. The striped bars highlight the results for the baseline 2K-entry BTB. As the figure shows, given an equivalent storage budget, Shotgun always outperforms Boomerang. On the Oracle workload, Shotgun, with a small storage budget equivalent to a 1K-entry conventional BTB outperforms Boomerang with an 8K-entry BTB (27% vs 26.3% performance improvement over no prefetch baseline). Similarly on DB2, Boomerang needs more than twice the BTB capacity to match Shotgun's performance. For instance, with a 2K-entry BTB, Shotgun delivers a 61.5% speedup, whereas Boomerang attains only a 58.9% speedup with a larger 4K-entry BTB. These results indicate that Shotgun's judicious use of BTB capacity translates to higher performance across a wide range of BTB sizes.

CONCLUSION

The front-end bottleneck in server workloads is a well-established problem due to frequent misses in the L1-I and the BTB. Prefetching can be effective at mitigating the misses; however, existing front-end prefetchers force a trade-off between coverage and storage overhead.

The present technique or "Shotgun", comprises a front-end prefetcher powered by a new BTB organization and design philosophy. The main observation behind Shotgun is that an application's instruction footprint can be summarized as a combination of its unconditional branch working set and a spatial footprint around the target of each unconditional branch. The former captures the global control flow (mostly function calls and returns), while the latter summarizes the local (intra-function) instruction cache working set. Based on this insight, Shotgun devotes the bulk of its BTB capacity to unconditional branches and their spatial footprints. Meanwhile, conditional branches can be maintained in a small-capacity dedicated BTB that is filled from the prefetched instruction cache blocks. In alternative examples, rather than providing dedicated unconditional and conditional BTBs, storage in a single BTB can be preferentially allocated to unconditional branch instructions relative to conditional branch instructions. By effectively summarizing the application's instruction footprint in the BTB, Shotgun enables a highly effective BTB-directed prefetcher that may largely erase the gap between metadata-free and metadata-rich state-of-the-art prefetchers.

REFERENCES

[1] Anastassia Ailamaki, David J. DeWitt, Mark D. Hill, and David A. Wood. 1999. DBMSs on a Modern Processor: Where Does Time Go?. In International Conference on Very Large Data Bases. 266-277.

[2] J. Bonanno, A. Collura, D. Lipetz, U. Mayer, B. Prasky, and A. Saporito. 2013. Two Level Bulk Preload Branch Prediction. In International Symposium on High-Performance Computer Architecture. 71-82.

[3] Ioana Burcea and Andreas Moshovos. 2009. Phantom-BTB: a virtualized branch target buffer design. In Proceedings of the 14th International Conference on Architectural Support for Programming Languages and Operating Systems, ASPLOS 2009, Washington, D.C., USA, Mar. 7-11, 2009. 313-324. DOI:http://dx.doi.org/10.1145/1508244.1508281

[4] I-Cheng K Chen, Chih-Chieh Lee, and Trevor N Mudge. 1997. Instruction Prefetching Using Branch Prediction Information. In International Conference on Computer Design. 593-601.

[5] Michael Ferdman, Cansu Kaynak, and Babak Falsafi. 2011. Proactive Instruction Fetch. In International Symposium on Microarchitecture. 152-162.

[6] Michael Ferdman, Thomas F. Wenisch, Anastasia Ailamaki, Babak Falsafi, and Andreas Moshovos. 2008. Temporal Instruction Fetch Streaming. In International Symposium on Microarchitecture. 1-10.

[7] P. Kallurkar and S. R. Sarangi. 2016. pTask: A smart prefetching scheme for OS intensive applications. In 2016 49th Annual IEEE/ACM International Symposium on Microarchitecture (MICRO). 1-12. DOI: http://dx.doi.org/10.1109/MICRO.2016.7783706

[8] Svilen Kanev, Juan Pablo Darago, Kim M. Hazelwood, Parthasarathy Ranganathan, Tipp Moseley, Gu-Yeon Wei, and David M. Brooks. 2015. Profiling a warehouse-scale computer. In International Symposium on Computer Architecture. 158-169.

[9] Cansu Kaynak, Boris Grot, and Babak Falsafi. 2013. SHIFT: Shared History Instruction Fetch for Lean-core Server Processors. In International Symposium on Microarchitecture. 272-283.

[10] Cansu Kaynak, Boris Grot, and Babak Falsafi. 2015. Confluence: Unified Instruction Supply for Scale-Out Servers. In International Symposium on Microarchitecture. 166-177.

[11] Kimberly Keeton, David A. Patterson, Yong Qiang He, Roger C. Raphael, and Walter E. Baker. 1998. Performance Characterization of a Quad Pentium Pro SMP using OLTP Workloads. In International Symposium on Computer Architecture. 15-26.

[12] Aasheesh Kolli, Ali G. Saidi, and Thomas F. Wenisch. 2013. RDIP:return-address-stack directed instruction prefetching. In The 46th Annual IEEE/ACM International Symposium on Microarchitecture, MICRO-46, Davis, Calif., USA, Dec. 7-11, 2013. 260-271.

[13] Rakesh Kumar, Cheng-Chieh Huang, Boris Grot, and Vijay Nagarajan. 2017. Boomerang: A Metadata-Free Architecture for Control Flow Delivery. In 2017 IEEE International Symposium on High Performance Computer Architecture, HPCA 2017, Austin, Tex., USA, Feb. 4-8, 2017. 493-504. DOI:http://dx.doi.org/10.1109/HPCA.2017.53

[14] Parthasarathy Ranganathan, Kourosh Gharachorloo, Sarita V. Adve, and Luiz André Barroso. 1998. Performance of Database Workloads on Shared-Memory Systems with Out-of-Order Processors. In International Conference on Architectural Support for Programming Languages and Operating Systems. 307-318.

[15] Glenn Reinman, Brad Calder, and Todd Austin. 1999. Fetch Directed Instruction Prefetching. In International Symposium on Microarchitecture. IEEE, 16-27.

[16] André Seznec and Pierre Michaud. 2006. A case for (partially) TAgged GEometric history length branch prediction. J. Instruction-Level Parallelism 8 (2006).

[17] L. Spracklen, Yuan Chou, and S. G. Abraham. 2005. Effective Instruction Prefetching in Chip Multiprocessors for Modern Commercial Applications. In 11th International Symposium on High-Performance Computer Architecture. 225-236.

[18] Thomas F. Wenisch, Roland E. Wunderlich, Michael Ferdman, Anastassia Ailamaki, Babak Falsafi, and James C. Hoe. 2006. SimFlex: Statistical Sampling of Computer System Simulation. IEEE Micro 26, 4 (2006), 18-31.

[19] Roland E. Wunderlich, Thomas F. Wenisch, Babak Falsafi, and James C. Hoe. 2003. SMARTS: Accelerating Microarchitecture Simulation via Rigorous Statistical Sampling. In International Symposium on Computer Architecture. 84-95.

[20] Tse-Yu Yeh and Yale N. Patt. 1992. A comprehensive instruction fetch mechanism for a processor supporting speculative execution. In International Symposium on Microarchitecture. 129-139.

EXAMPLES

The following numbered examples pertain to the present technique.

Example 1. A branch target buffer, BTB, to store at least one BTB entry corresponding to a respective branch in a control flow in a sequence of machine-readable instructions of a computer program, the BTB entry comprising:
  a tag field to compare with a program counter of a fetch address generator to determine if there is a match between the program counter and information regarding a branch instruction currently stored in the BTB; and
  at least one further field to store information characteristic of the branch instruction identified by the corresponding tag field, the at least one further field allowing a conditional branch to be distinguished from an unconditional branch instruction;
  wherein the BTB has a predetermined storage capacity and wherein unconditional branch instructions are preferentially allocated storage space in the BTB relative to conditional branch instructions.

Example 2. The BTB of example 1, comprising an unconditional branch target buffer, U-BTB, dedicated to storage of unconditional branch instructions and a conditional branch target buffer, C-BTB, dedicated to storage of conditional branch instructions.

Example 3. The BTB of example 1 or example 2, wherein the branch instruction is an unconditional branch instruction, and wherein the at least one further field of the BTB comprises a target field to identify a branch target address of a corresponding unconditional branch instruction.

Example 4. The BTB of example 3, wherein, the at least one further field further comprises a call footprint field to identify a spatial region in a memory, of program instructions of a local function, wherein the local function is a set of instructions located at a branch target of the unconditional branch instruction.

Example 5. The BTB of example 4, wherein the BTB entry further comprises a return footprint field identifying a spatial footprint in the memory of a sequence of program instructions corresponding to a control flow upon return from the local function until a subsequent unconditional branch instruction.

Example 6. The BTB of any one of examples 1 to 5, wherein the BTB entry comprises a type field to specify a type of the corresponding branch instruction.

Example 7. The BTB of example 4 or example 5, wherein the call footprint field is to identify a code region in the memory comprising a plurality of blocks of the memory as the spatial footprint of the local function.

Example 8. The BTB of example 7, wherein the plurality of blocks comprise at least one of: cache blocks, main memory blocks or blocks of virtual memory.

Example 9. The BTB of any one of examples 4 to 8, wherein the call footprint field comprises a footprint vector having an entry for each of a plurality of memory blocks of the spatial footprint, each vector entry indicating whether or not the corresponding memory block was accessed during a previous execution of the corresponding local function.

Example 10. The BTB of example 9, wherein at least a subset of the footprint vector elements represent relative block distances from the branch target block, the relative distances comprising at least one of positive relative distances and negative relative distances.

Example 11. The BTB of any one of examples 1 to 10, wherein the tag identifies a basic block of instructions comprising a sequence of instructions terminating with a branch instruction and wherein the BTB entry comprises a size field to specify at least one of one of a number of instructions in the basic block identified by the tag or a number of bytes in the basic block identified by the tag.

Example 12. The BTB of any one of examples 1 to 11, wherein the preferential allocation of BTB storage to unconditional branch instructions relative to conditional branch instructions is implemented such that one or more BTB entries are allocated to conditional branches responsive to a hit in the BTB for an unconditional branch, wherein the conditional branch instructions to which BTB storage is allocated correspond to conditional branches in a code region corresponding to the branch target of the unconditional branch resulting in the BTB hit.

Example 13. The BTB of any one of examples 3 to 5, wherein a hit in the BTB for an unconditional branch triggers prefetching to a level 1, L1, instruction cache of a plurality of program instructions in a memory region depending on the branch target address.

Example 14. The BTB of any one of examples 1 to 3, wherein a hit in the BTB for an unconditional branch triggers prefetching to a level 1, L1, instruction cache of a predetermined number of consecutive memory blocks in a branch target address region or a predetermined number of consecutive program instructions in a branch target address region responsive to the BTB hit.

Example 16. The BTB of example 13, wherein all cache blocks between an entry point to the target region and an exit point of the target region are prefetched to the L1 instruction cache responsive to the BTB hit.

Example 17. The BTB of example 2, comprising:
a return instruction buffer, RIB, having at least one RIB entry comprising a return tag field to identify a return instruction; and
a return address stack, RAS, to store a return address corresponding to an address of a basic block containing a function call;
wherein the RIB entry omits a target address field for the return instruction and
wherein the BTB is to retrieve for the return instruction identified by the return tag field, the basic block address most recently pushed onto the RAS and to use the retrieved basic block address to index the U-BTB.

Example 18. A data processing apparatus comprising the Branch Target Buffer of any one of examples 1 to 17.

Example 19. The data processing apparatus of example 18 when dependent on example 2 or example 17, the data processing apparatus comprising:
a fetch target queue, FTQ, having a plurality of FTQ entries to identify a sequence of instructions to be fetched for execution;
a prefetch engine to respond to a BTB hit in one of the U-BTB or the RIB to issue a prefetch probe to retrieve from a memory, one or more program instructions in a target region corresponding to the BTB hit for storage in an instruction cache.

Example 20. Data processing apparatus according to example 19 when dependent on example 17, wherein when the BTB hit is an RIB hit, a read operation is performed to read the RAS to determine a block address corresponding to the preceding function call and to access a U-BTB entry corresponding to the block address to determine a spatial footprint for the RIB hit.

Example 21. Data processing apparatus as claimed in claim 19, wherein when the BTB hit is a hit in a conditional BTB or in the U-BTB or in the RIB, the FTQ is populated based on a size field of the BTB.

Example 22. Data processing apparatus according to example 19, wherein the prefetch engine is arranged to prefetch instructions corresponding to a spatial footprint of a local function specified by a footprint field of a BTB entry for an unconditional branch instruction, the spatial footprint corresponding to a location in memory of program instructions located at proximal to a branch target of the unconditional branch instruction.

Example 23. Data processing apparatus according to example 22, comprising a predecoder to decode the prefetched instructions corresponding to the spatial footprint.

Example 24. Data processing apparatus according to example 23, wherein the predecoder is to identify any conditional branch instructions in the decoded prefetched instructions of the spatial footprint and to populate the BTB using the identified conditional branches.

Example 25. Data processing apparatus according to example 18, wherein the BTB comprises a U-BTB dedicated to storage of unconditional branch instructions, a C-BTB dedicated to storage of conditional branch instructions and an RIB having at least one RIB entry comprising a return tag field to identify a return instruction, and wherein the BTB is to perform a parallel lookup of the U-BTB, the C-BTB and the RIB based on an address output by a fetch address generator.

Example 26. Data processing apparatus according to example 25, wherein when a BTB miss is encountered as a result of the parallel lookup, the data processing apparatus is to issue a BTB miss probe to memory to trigger a BTB fill to resolve the BTB miss.

Example 27. Data processing apparatus of example 20, arranged to update the spatial footprint based on retired instructions following execution of instructions of the spatial footprint.

Example 28. A method of buffering branch instructions in a branch target buffer, BTB, of a data processing apparatus, the method comprising:
comparing with a program counter of a fetch address generator with a tag field of a BTB entry to determine if there is a match between the program counter and information regarding a branch instruction currently stored in the BTB; and
using at least one further field of the BTB entry to store information characteristic of the branch instruction identified by the corresponding tag field, the at least one further field allowing a conditional branch instruction to be distinguished from an unconditional branch instruction; and
preferentially allocating storage space in the BTB to conditional branch instructions relative to allocating storage space to unconditional branch instructions.

Example 29. Machine-readable instructions provided on a transitory or non-transitory medium, the instructions upon execution to cause at least one processor to:
compare with a program counter of a fetch address generator, a tag field of a BTB entry to determine if there is a match between the program counter and information regarding a branch instruction currently stored in the BTB;
use at least one further field of the BTB entry to store information characteristic of the branch instruction identified by the corresponding tag field, the at least one further field allowing a conditional branch to be distinguished from an unconditional branch instruction; and
control allocation of a predetermined storage capacity of the BTB to preferentially allocate storage space to conditional branch instructions relative to allocating storage space to unconditional branch instructions.

A data processing apparatus according to the present technique may be provided as a self-contained unit, such as a branch prediction and instruction prefetching unit for use with a microprocessor or as a separately supplied component or may be fabricated on the same integrated circuit as one or more microprocessors and supplied as an integral unit.

The data processing apparatus according to the present technique may be incorporated in a server microprocessor to form part of a server or may be incorporated in another type of microprocessor or microcontroller, either general or specialised. The data processing apparatus according to the present technique may be incorporated into an electronic apparatus such as, for example, a server, a workstation, a mainframe computer, a personal computer, a tablet computer, a mobile phone, a control system for an automobile or any autonomous vehicle, an embedded system, a household device or an appliance.

One or more software programs or machine-readable instructions that may implement or utilize the various techniques of the examples described herein may be implemented in a high level procedural or object-oriented programming language. However, the program(s) may alternatively be implemented in assembly or machine language. In any case, the language may be a compiled or interpreted language, and combined with hardware implementations. The program instructions may be provided on a transitory (e.g. transmission) or a non-transitory (e.g. storage) medium or a combination thereof.

Where apparatus components have been described as circuitry or units or engines or the like, the circuitry or unit or engine or the like may be general purpose processor circuitry configured by program code to perform specified processing functions. The circuitry or unit or engine or the like may also be configured by specific modification to the processing hardware. Configuration of the circuitry or unit or engine or the like to perform a specified function may be entirely in hardware, entirely in software or using a combination of hardware modification and software execution. Machine-readable instructions may be used to configure logic gates of general purpose or special-purpose processing circuitry to perform a specified processing function.

An apparatus component may be implemented, for example, as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like. Executable program code (machine-readable instructions) of an identified component need not be physically located together, but may comprise disparate instructions stored in different locations which, when joined logically together, comprise the component and achieve the stated purpose for the component. Examples may be implemented at least in part in a cloud computing environment, where processing functions are distributed across different geographical locations.

In this description the phrase at least one of "A" or "B" (or "C" and so on) is intended to include all individual elements and all combinations of the stated list (A, B, C etc.). For example, "at least one of: A, B or C" is intended to include the alternatives of: just A; just B; just C; A and B; A and C; B and C; or A and B and C.

The invention claimed is:

1. A branch target buffer, BTB, to store at least one BTB entry corresponding to a respective branch in a control flow in a sequence of machine-readable instructions of a computer program, the at least one BTB entry comprising:
    a tag field to compare with a program counter of a fetch address generator to determine if there is a match between the program counter and information regarding a branch instruction currently stored in the BTB; and
    at least two further fields to store information characteristic of the branch instruction;
    wherein the BTB has a predetermined storage capacity and wherein unconditional branch instructions are preferentially allocated storage space in the BTB relative to conditional branch instructions,
    wherein the branch instruction is an unconditional branch instruction and the at least two further fields of the BTB comprise:
        a target field to identify a branch target address of the unconditional branch instruction; and
        a call footprint field to identify a spatial region in a memory, of program instructions of a local function, wherein the local function is a set of instructions located at a branch target of the unconditional branch instruction.
2. The BTB of claim 1, comprising an unconditional branch target buffer, U-BTB, dedicated to storage of unconditional branch instructions and a conditional branch target buffer, C-BTB, dedicated to storage of conditional branch instructions.

3. The BTB of claim 2, comprising:
    a return instruction buffer, RIB, having at least one RIB entry comprising a return tag field to identify a return instruction; and
    a return address stack, RAS, to store a return address corresponding to an address of a basic block containing a function call;
    wherein the at least one RIB entry omits a target address field for the return instruction and wherein the BTB is to retrieve for the return instruction identified by the return tag field, a basic block address most recently pushed onto the RAS and to use the retrieved basic block address to index the U-BTB.

4. A data processing apparatus comprising the Branch Target Buffer of claim 3, further comprising:
    a fetch target queue, FTQ, having a plurality of FTQ entries to identify a sequence of instructions to be fetched for execution; and
    a prefetch engine to respond to a BTB hit in one of the U-BTB or the RIB to issue a prefetch probe to retrieve from a memory, one or more program instructions in a target region corresponding to the BTB hit for storage in an instruction cache.

5. The data processing apparatus as claimed in claim 4, wherein the prefetch engine is arranged to prefetch the instructions corresponding to the spatial region of the local function specified by the call footprint field of the BTB entry for the unconditional branch instruction, the spatial region corresponding to a location in the memory of the program instructions.

6. The data processing apparatus as claimed in claim 5, comprising a predecoder to decode the prefetched instructions corresponding to the spatial region.

7. The data processing apparatus as claimed in claim 4, wherein the BTB is to perform a parallel lookup of the U-BTB, the C-BTB and the RIB based on an address output by a fetch address generator.

8. The BTB of claim 1, wherein the at least one BTB entry further comprises a return footprint field identifying a spatial footprint in the memory of a sequence of program instructions corresponding to a control flow upon return from the local function until a subsequent unconditional branch instruction.

9. The BTB of claim 1, wherein the call footprint field is to identify a code region in the memory comprising a plurality of blocks of the memory as the spatial region of the local function.

10. The BTB of claim 1, wherein the call footprint field comprises a footprint vector having an entry for each of a plurality of memory blocks of the spatial region, each footprint vector entry indicating whether or not the corresponding memory block was accessed during a previous execution of the local function.

11. The BTB of claim 10, wherein at least a subset of the footprint vector entries represent relative block distances from a branch target block, the relative block distances comprising at least one of positive relative distances and negative relative distances.

12. The BTB of claim 1, wherein a hit in the BTB for the unconditional branch instruction triggers prefetching to a level 1, L1, instruction cache of a plurality of program instructions in a memory region depending on the branch target address.

13. The BTB of claim 1, wherein the tag field identifies a basic block of instructions comprising a sequence of instructions terminating with a branch instruction and wherein the at least one BTB entry comprises a size field to specify a number of instructions in the basic block identified by the tag field or a number of bytes in the basic block identified by the tag field.

14. The BTB of claim 1, wherein the preferential allocation of BTB storage to unconditional branch instructions relative to conditional branch instructions is implemented such that one or more BTB entries are allocated to the conditional branch instructions responsive to a hit in the BTB for an unconditional branch, wherein the conditional branch instructions to which BTB storage is allocated correspond to conditional branch instructions in a code region corresponding to a branch target of the unconditional branch resulting in the BTB hit.

15. The BTB of claim 1, wherein a hit in the BTB for an unconditional branch triggers prefetching to a level 1, L1, instruction cache of a predetermined number of consecutive memory blocks in a branch target address region or a predetermined number of consecutive program instructions in a branch target address region responsive to the BTB hit.

16. A method using a branch target buffer, BTB, of a data processing apparatus, the method comprising:
- comparing a program counter of a fetch address generator with a tag field of a BTB entry to determine if there is a match between the program counter and information regarding a branch instruction currently stored in the BTB; and
- using at least two further fields of the BTB entry to store information characteristic of the branch instruction; and
- preferentially allocating storage space in the BTB to unconditional branch instructions relative to allocating storage space to conditional branch instructions, wherein the branch instruction is an unconditional branch instruction and the at least two further fields of the BTB comprise:
- a target field to identify a branch target address of the unconditional branch instruction; and
- a call footprint field to identify a spatial region in a memory, of program instructions of a local function, wherein the local function is a set of instructions located at a branch target of the unconditional branch instruction.

17. Machine-readable instructions provided on a non-transitory medium, the machine-readable instructions upon execution to cause at least one processor to:
- compare with a program counter of a fetch address generator, a tag field of a branch target buffer (BTB) entry to determine if there is a match between the program counter and information regarding a branch instruction currently stored in the BTB;
- use at least two further fields of the BTB entry to store information characteristic of the branch instruction; and
- control allocation of a predetermined storage capacity of the BTB to preferentially allocate storage space to unconditional branch instructions relative to allocating storage space to conditional branch instructions, wherein the branch instruction is an unconditional branch instruction and the at least two further fields of the BTB comprise:
- a target field to identify a branch target address of the unconditional branch instruction; and
- a call footprint field to identify a spatial region in a memory, of program instructions of a local function, wherein the local function is a set of instructions located at a branch target of the unconditional branch instruction.

\* \* \* \* \*